(12) United States Patent
Waterbury

(10) Patent No.: US 8,427,451 B2
(45) Date of Patent: Apr. 23, 2013

(54) MULTI-TOUCH SENSOR APPARATUS AND METHOD

(75) Inventor: Charles A. Waterbury, Phoenix, AZ (US)

(73) Assignee: Wacom Co., Ltd., Saitama (JP)

( * ) Notice: Subject to any disclaimer, the term of this patent is extended or adjusted under 35 U.S.C. 154(b) by 670 days.

(21) Appl. No.: 12/650,400

(22) Filed: Dec. 30, 2009

(65) Prior Publication Data

US 2011/0157066 A1    Jun. 30, 2011

(51) Int. Cl.
    *G06F 3/45*    (2011.01)
(52) U.S. Cl.
    USPC .......................................................... 345/174
(58) Field of Classification Search .......... 345/156–179; 178/18.01–18.06; 463/37; 455/566
    See application file for complete search history.

(56) References Cited

U.S. PATENT DOCUMENTS

| | | | |
|---|---|---|---|
| 4,686,332 A * | 8/1987 | Greanias et al. ............... | 345/173 |
| 5,825,352 A | 10/1998 | Bisset | |
| 5,844,506 A | 12/1998 | Binstead | |
| 6,856,259 B1 | 2/2005 | Sharp | |
| 7,599,520 B2 * | 10/2009 | Dempski et al. ............... | 382/103 |
| 7,982,723 B2 * | 7/2011 | Ningrat ........................... | 345/174 |
| 2008/0158169 A1 * | 7/2008 | O'Connor et al. ............. | 345/173 |
| 2009/0143141 A1 * | 6/2009 | Wells et al. ..................... | 463/37 |
| 2009/0256817 A1 * | 10/2009 | Perlin et al. .................... | 345/174 |
| 2009/0273579 A1 | 11/2009 | Zachut et al. | |
| 2009/0289918 A1 | 11/2009 | Muranaka | |
| 2009/0295753 A1 * | 12/2009 | King et al. ...................... | 345/174 |
| 2010/0026656 A1 * | 2/2010 | Hotelling et al. .............. | 345/174 |
| 2010/0188345 A1 * | 7/2010 | Keskin et al. .................. | 345/173 |
| 2010/0194701 A1 * | 8/2010 | Hill ................................. | 345/173 |
| 2010/0245246 A1 * | 9/2010 | Rosenfeld et al. ............. | 345/163 |
| 2011/0242052 A1 * | 10/2011 | Ningrat ........................... | 345/174 |

FOREIGN PATENT DOCUMENTS

| | | |
|---|---|---|
| JP | 9-511086 A | 11/1997 |
| JP | 2009-282680 A | 12/2009 |
| JP | 2011-519458 A | 7/2011 |

OTHER PUBLICATIONS

"CapSense™ Sigma-Delta Plus ADC User Module," Document No. 001-45879, Rev. D, www.cypress.com, Cypress Semiconductor, San Jose, Calif., Jun. 23, 2009, pp. 1-27.
Kolokowsky, S., and T. Davis, "Touchscreens 101: Understanding Touchscreen Technology and Design," www.cypress.com, Cypress Semiconductor Corporation, San Jose, Calif., Jun. 2009, pp. 1-5.
Peterson, J., "Capacitive Sensing 101," www.cypress.com, Cypress Semiconductor Corporation, San Jose, Calif., Oct. 2006, pp. 1-7.
Office Action, for corresponding Japanese Application No. 2010-071191, dated Dec. 14, 2011, 2 pages.

* cited by examiner

*Primary Examiner* — Prabodh M Dharia
(74) *Attorney, Agent, or Firm* — Seed IP Law Group PLLC

(57) ABSTRACT

A device and method for detecting actual touch points in a multi-touch input device. Embodiments include a measurement sharing device configured to combine a measurement of an electrical characteristic on a first axis with a measurement of an electrical characteristic on a second axis. The combined measurement is compared with electrical characteristics measured separately on each axis to determine which intersections correspond to actual touch points.

22 Claims, 12 Drawing Sheets

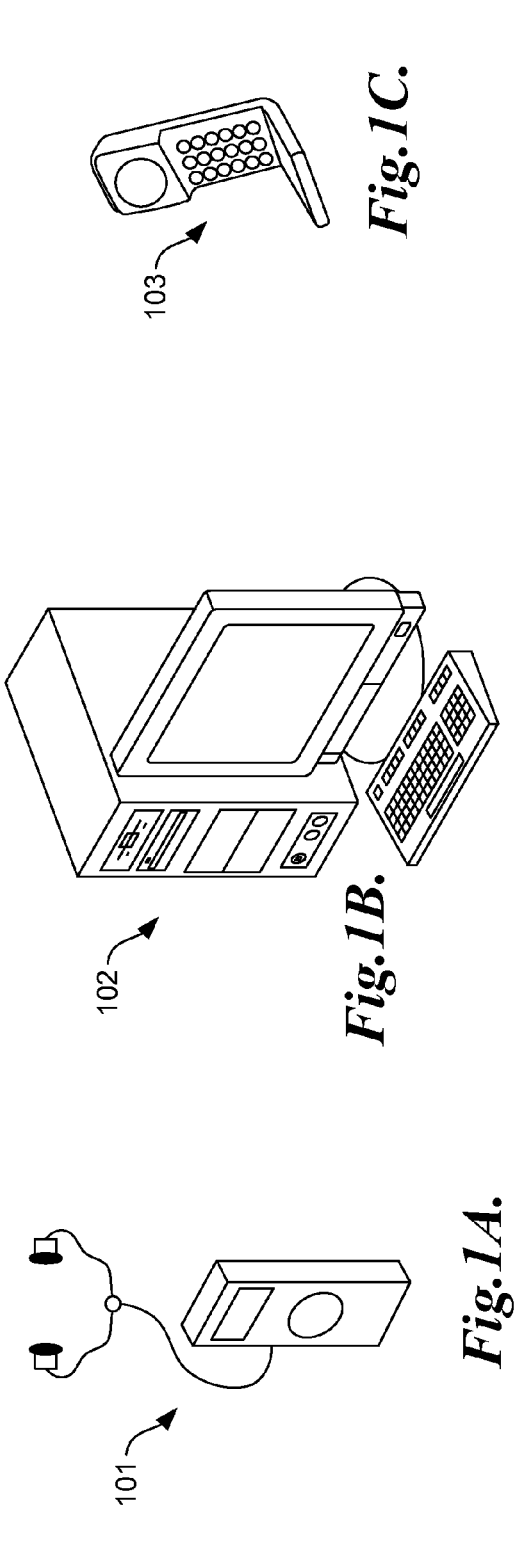
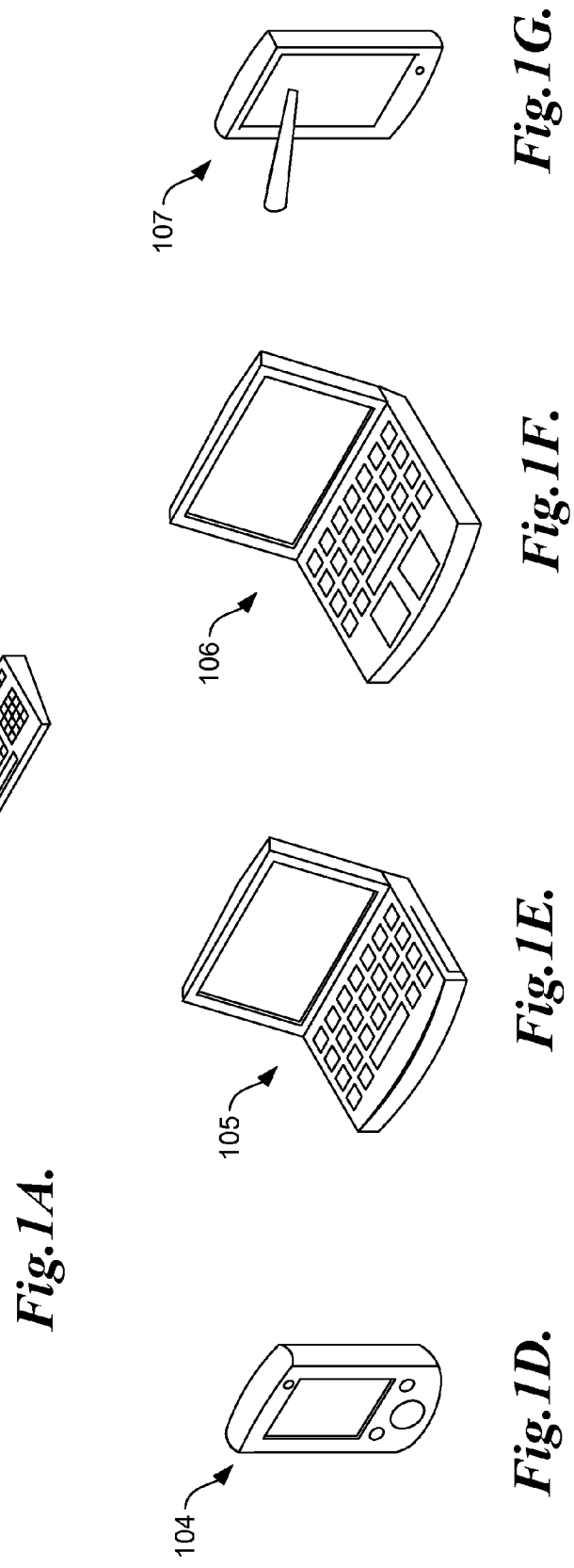

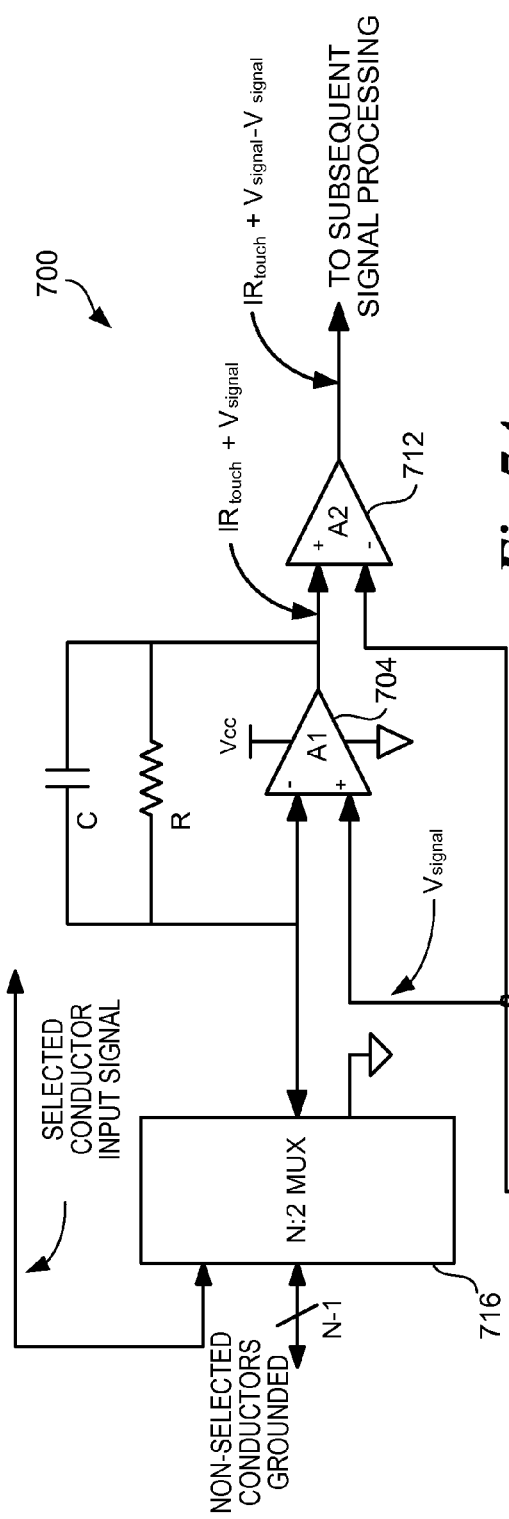
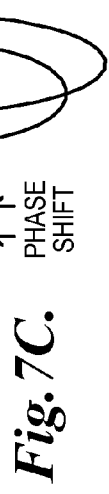
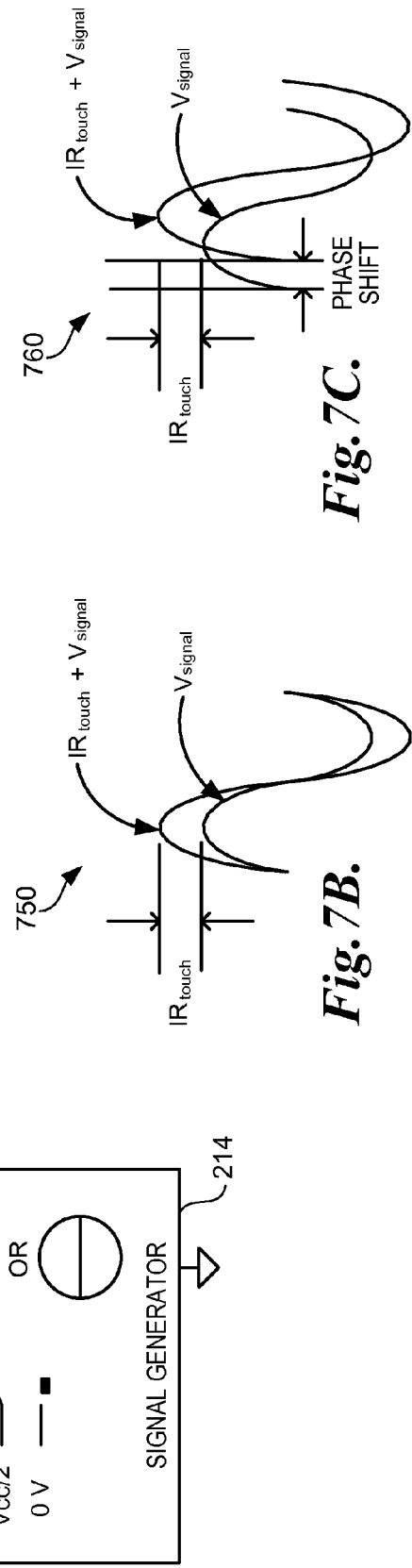
Fig. 7A.
Fig. 7B.
Fig. 7C.

MULTI-TOUCH SENSOR APPARATUS AND METHOD

BACKGROUND

Touchscreen technology is relatively new in the world of displays for stationary and mobile devices. Traditionally, an underlying layer of lines that can sense a user's touch are arranged in a patterned manner and are monitored iteratively for a signal that suggests a coordinate of a point that is touched. Initial systems were designed to detect only a single touch at a time. A new emphasis, however, is to develop touchscreen technology that can accurately detect multiple simultaneous touches. Some current technology for multi-finger touch works by charging and discharging a voltage on a row or column of a grid of conductors and detecting a change in the charge when touched.

In discriminating between actual touch locations made by a user interacting with the touchscreen and false/phantom touch locations (that is, a detected signal that does not correspond to a user's actual touch, otherwise known as "ghost points"), previous solutions have proven inadequate. Moreover, previous solutions that try to address this problem oftentimes require a significant amount of additional hardware components. Clearly, certain design considerations within touchscreens and touchscreen systems include efforts to reduce costs, complexity, size, and so on. The previous solutions have failed to provide an adequate and cost-effective solution to these issues.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure distinguish actual touch locations from ghost points on a multi-touch input device by performing combined measurements on a first conductor and a second conductor, and comparing those measurements to separate measurements on the first conductor and second conductor. The difference between the combined measurements and the separate measurements is detectably greater when analyzing a touch point than when analyzing a ghost point, and this difference can be used to distinguish the touch points from the ghost points.

In one embodiment, a method executed by a multi-touch input device for detecting actual touch points is provided. A first location and a second location on a first axis at which a touch is indicated are determined. A first location and a second location on a second axis at which a touch is indicated are also determined. A conductor at the first location on the first axis and a conductor at the first location on the second axis are multiplexed to perform a first combined measurement, and a conductor at the first location on the first axis and a conductor at the second location on the second axis are multiplexed to perform a second combined measurement. Separate measurements performed on the conductor at the first location on the first axis, on the conductor at the first location on the second axis, and on the conductor at the second location on the second axis, are compared to the first combined measurement and the second combined measurement. A first touch point and a second touch point are transmitted to a host device based on the comparison.

In another embodiment, a method in a multi-touch sensor of detecting touch points is provided. The method comprises obtaining a first combined capacitance value by measuring a combined capacitance of a first X conductor at a first X location and a first Y conductor at a first Y location; obtaining a second combined capacitance value by measuring a combined capacitance of the first X conductor and a second Y conductor at a second Y location; comparing the combined capacitance values to a separate capacitance value of the first X conductor, the first Y conductor, and the second Y conductor to determine which intersections of the first X location, a second X location, the first Y location, and the second Y location correspond to objects in contact with the sensor; and providing the intersections which are determined to correspond to objects in contact with the sensor for further processing by a host device.

In yet another embodiment, a multi-touch sensor is provided. The multi-touch sensor comprises a first plurality of conductors arranged in a first direction; and a second plurality of conductors arranged in a second direction and intersecting the first plurality of conductors. The multi-touch sensor also comprises a signal measurement device, a conductor selecting device, a measurement sharing device, and a position identification device. The signal measurement device is configured to receive measurement signals from the conductors. The conductor selecting device is configured to couple a conductor of the first plurality of conductors to the measurement sharing device, and to separately couple a conductor of the second plurality of conductors to the measurement sharing device. The position identification device is configured to instruct the measurement sharing device and the conductor selecting device to couple a conductor from the first plurality of conductors and a conductor from the second plurality of conductors to the signal measurement device, and is further configured to receive representations of signal measurements from the signal measurement device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A illustrates an embodiment of a handheld media unit;

FIG. 1B illustrates an embodiment of a desktop computer;

FIG. 1C illustrates an embodiment of a wireless communication device;

FIG. 1D illustrates an embodiment of a personal digital assistant (PDA);

FIG. 1E illustrates an embodiment of a laptop computer;

FIG. 1F illustrates an embodiment of a laptop computer with an integrated touch-sensitive input device on the palm rest;

FIG. 1G illustrates an embodiment of an electronic tablet;

FIG. 7A is a functional block diagram of signal generation and detection circuitry for detecting touch on a touchscreen according to one embodiment of the invention;

FIG. 7B is a signal diagram that illustrates operation of signal generation and detection circuitry for detecting touch on a touchscreen according to one embodiment of the invention;

FIG. 7C is a signal diagram that illustrates operation of signal generation and detection circuitry for detecting touch on a touchscreen according to one embodiment of the invention;

DETAILED DESCRIPTION

Figure 2:
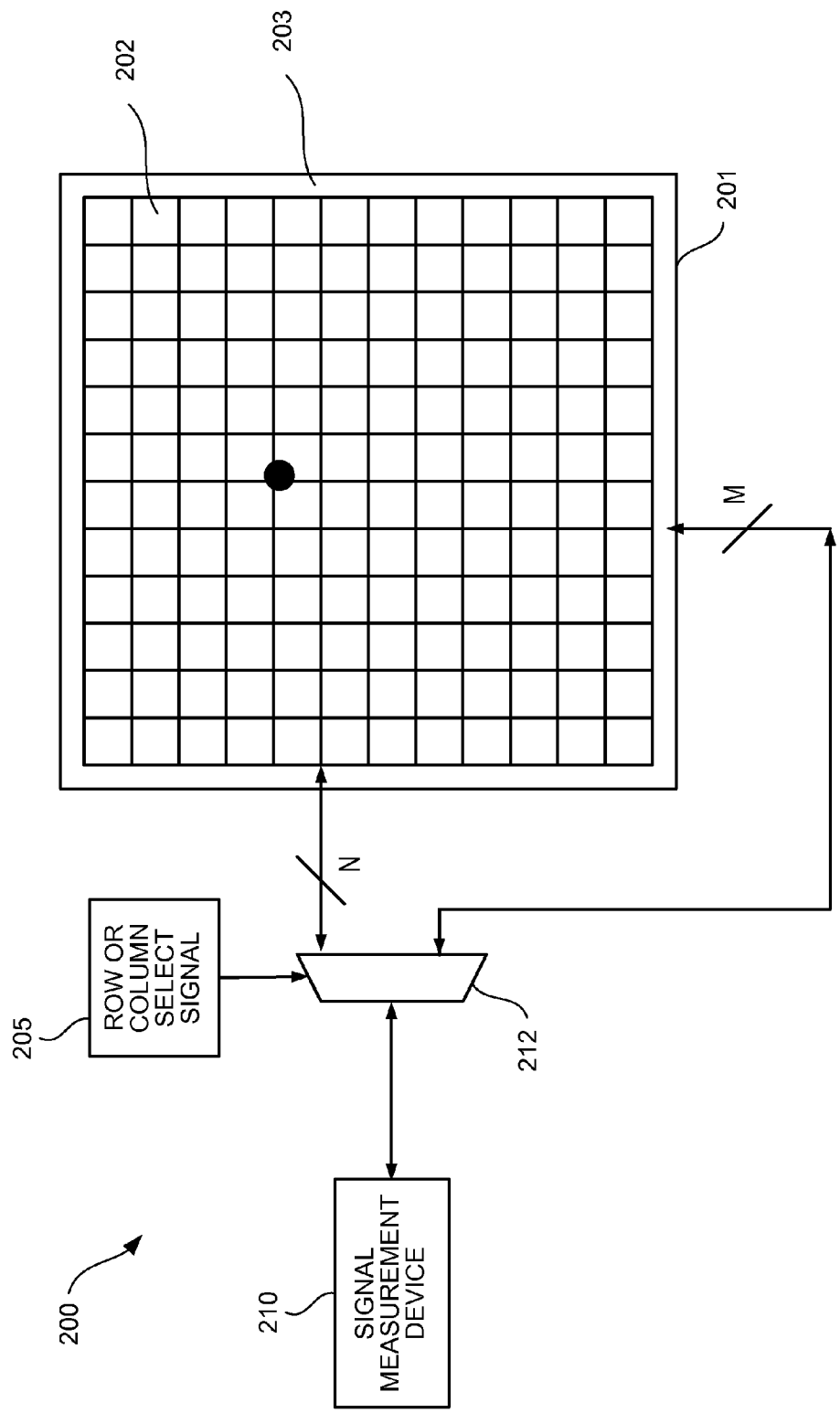
FIG. 2 illustrates an exemplary embodiment of a touch-sensitive input device having a plurality of conductors arranged in a first direction and a plurality of conductors arranged in a second direction.

Devices that include some form of man to machine interface (MMI) are employed in a wide variety of contexts. There are varieties of types of MMIs that allow a user to provide information to and retrieve information from a device (e.g., keyboard of a device such as a computer, an interactive panel/touchscreen on any number of devices such as a self-service gas pump, a self-service check in terminal at an airport, etc.). MMIs that are implemented using touch-sensitive input devices in which a user interacts with the device using a finger or some other implement (e.g., a stylus or other means by which a location on the device is indicated by the user) are increasing in their prevalence. Any of a wide variety of host devices may include a MMI having at least a portion of which includes a touch-sensitive input device.

To detect a user's interaction with a touch-sensitive input device, a signal is applied in turn to each conductor of a conductor pattern. In one embodiment, changes in the applied signal are monitored to help determine the location of a user's interaction with the input device. Alternatively, a signal received from another conductor of the conductor pattern can be used to help determine the location of a user's interaction. In some embodiments, a combination of these two detection approaches is employed.

In one embodiment, first conductors are aligned in a first direction and are disposed on a first layer of an input device (e.g., an upper and/or top layer), and second conductors are aligned in a second direction and are disposed on a second layer of the input device (e.g., a lower and/or bottom layer). In some embodiments, a spacing between the first conductors and a spacing between the second conductors are substantially equal. In another embodiment, the respective spacing between the first conductors is greater than the respective spacing between the second conductors. This is achieved by aligning the first conductors apart from one another. It can also be achieved by having holes or windows within at least some of the first conductors to allow the coupling of an energized signal via capacitance to the first conductors at an intersection of at least one of the first conductors and at least one of the second conductors.

As one of the second conductors is energized or charged with a signal, each of the other second conductors is grounded. Among other beneficial effects, this helps the other second conductors to serve as an electromagnetic interference (EMI) shield to limit injected noise from any of a number of sources such as a host system, an LCD backlight, any noise source under and/or behind the input device, and the like, from undesirably affecting the first conductors. This effective solid back-layer of the conductor pattern (e.g., the second conductors) effectively shields the upper layer or layers from noises produced under or behind the input device.

This EMI shield created by the plurality of second conductors on the second or bottom layer or plane also operates to remove changes in any capacitive coupling due to the flexing of a substrate of the input device, such as when the input device becomes bowed or bent due to stress such as a user's forceful interaction with the input device. This elimination and/or reduction of such effects can allow for a variety of substrates to be used. In one particular instance, it beneficially enables the use of non-rigid materials for the construction of the input device, which is normally not possible with traditional substrate materials.

FIGS. 1A-1G illustrate a non-exhaustive group of devices which can include embodiments of the touch-sensitive input device described herein. FIG. 1A illustrates an embodiment of a handheld media unit 101 for providing general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format. Historically, such handheld media units were primarily employed for storage and playback of audio media; however, such a handheld media unit 101 may be employed for storage and playback of virtually any media, such as audio media, video media, photographic media, and the like. Moreover, such a handheld media unit 101 can also include other functionality not related to media playback and storage, such as integrated communication functionality for wired and wireless communications.

To allow a user to provide commands to and select certain functions of the handheld media unit 101, the handheld media unit 101 includes at least one touchscreen, an embodiment of a touch-sensitive input device as described herein that is transparent or translucent to allow the touch input to coincide with images displayed on a screen. Selections on the touchscreen may be made by a user's finger or other bodily portion. Alternatively, the handheld media unit 101 may include some user-provided implement such as a stylus that the user may employ to provide commands to and select functions via the touchscreen of the handheld media unit 101.

FIG. 1B illustrates an embodiment of a computer 102. The computer 102 can be a desktop computer, an enterprise storage device such as a server, a host computer that is attached to a storage array such as a redundant array of independent disks (RAID) array, a storage router, an edge router, a storage switch, a storage director, and the like.

A display monitor of the computer 102 can have touch-sensitive input capability or include a touchscreen. Alternatively, only a portion of the monitor can have touch-sensitive input capability. A peripheral device of the computer 102, such as a keyboard, mouse, drawing tablet, or other peripheral device, can also include a touch-sensitive input device. A user provides commands to the computer 102 via the touchscreen. Selections on the touchscreen may be made by touching indicated areas with a user's finger (or other bodily portion), a pointing implement such as a stylus, or any other object capable of causing a detectable change in the signal applied to the conductor pattern. For the sake of simplicity, all references herein to a user touching a touch-sensitive input device should be construed to include all methods capable of actuating the touch-sensitive input device.

FIG. 1C illustrates an embodiment of a wireless communication device 103. Wireless communication device 103 is capable of communicating via a wireless network such as a cellular, personal communications service (PCS), general packet radio service (GPRS), global system for mobile communications (GSM), integrated digital enhanced network (iDEN), or any other wireless communications network capable of sending and receiving wireless communications. Further, wireless communication device 103 is also capable of communicating via the Internet to access email, download content, access websites, and provide streaming audio and/or video programming. Wireless communication device 103 can place and receive voice calls, text messages such as emails, short message service (SMS) messages, pages, and other data messages that can include attachments such as documents, audio files, video files, images, and the like.

The wireless communication device 103 includes a touch-sensitive input device such as a touchscreen that allows a user of the communication device 103 to provide commands to and select certain functions of the communication device 103. For example, a user may touch the touchscreen in a specified location to indicate selection from a list of displayed options, or a user may touch the touchscreen in a specified manner to indicate a specified command, such as performing a single or double tap.

FIG. 1D illustrates an embodiment of a personal digital assistant (PDA) 104. The PDA 104 includes a touch-sensitive input device that allows a user of PDA 104 to provide commands to and select certain functions of the PDA 104. For example, a user may touch a touch-sensitive input device such as a touchscreen in a specified location to indicate selection of a displayed item. As another example, a user may touch a touch-sensitive input device in a specified manner, such as with a specific gesture, to indicate a specified command.

FIG. 1E illustrates an embodiment of a laptop computer 105. The monitor of the laptop computer 105 can have touch-sensitive input capability, such as in a tablet form factor laptop. In another embodiment, only a portion of the monitor has such a capability. A peripheral device of the laptop computer 105, such as an external keyboard, mouse, trackpad or other peripheral device, can also include a touch-sensitive input device thereon. A user can interact with the laptop computer 105 by touching the touch-sensitive input device to provide commands, and/or to select certain functions via the touch-sensitive input device. For example, a user can touch a touchscreen in a specified location to indicate selection of a displayed item or, a user can touch the touchscreen in a specified manner to indicate a specified command.

FIG. 1F illustrates an embodiment of a laptop computer 106 similar to the laptop computer 105 of FIG. 1E, but having an integrated touch-sensitive input device, such as a trackpad, touchpad, drawing tablet, or the like, on the palm rest. A user may provide commands to the laptop computer 106 and select certain functions via the trackpad. For example, a user can touch the trackpad in a specified location to indicate selection or, alternatively, a user can touch the trackpad in a specified manner to indicate a specified command.

FIG. 1G illustrates an embodiment of an electronic tablet 107. The electronic tablet 107 includes a stylus that a user employs to provide commands to and select certain functions of the electronic tablet 107 via a touch-sensitive input device of the electronic tablet 107 that detects touches by the stylus. The electronic tablet 107 also includes capabilities to support integrated computing, data storage, and the like, that allow the electronic tablet 107 to operate, at least in some respects, like a computer or laptop computer. However, the electronic tablet 107 includes no integrated keyboard. It is noted, however, that a virtual keyboard may be displayed on the electronic tablet 107, and buttons thereof may be selected by the stylus that the user employs. An alternative embodiment of such an electronic tablet does not require the use of a stylus, and certain selections on such an electronic tablet may be made by a user's touch.

As can be seen, a wide variety of devices may employ a touch-sensitive input device to affect at least one part of an MMI thereto. There are various means by which a user's interaction with a touchscreen can be detected.

FIG. 2 is a simplified illustration of an exemplary embodiment of a device 200 having a touch-sensitive input device included therein. The illustrated device 200 includes a touchscreen 201, but the description below also applies to embodiments of touch-sensitive input devices that are not integrated with a display.

A number of conductors form rows and columns of a conductor pattern 202. In one embodiment, indium tin oxide (ITO) is deposited on a substrate composed of polyester on one or more layers of the touchscreen 201 to form the conductor pattern 202. In other embodiments, other suitable materials are used for the conductors and the substrate. As illustrated, a first portion of the conductor pattern 202, which makes up the rows of the conductor pattern 202, is disposed on a first layer, and a second portion of the conductor pattern 202, which makes up the columns of the conductor pattern 202, is disposed on a second layer. In one example, the conductors forming the columns are disposed on the first layer, and the conductors forming the rows are disposed on the second layer.

While the illustrated embodiment includes rows and columns that are perpendicular to one another, there are other embodiments in which a plurality of first conductors are aligned in a first direction and a plurality of second conductors are aligned in a second direction that is different to the first direction, wherein there are no particular requirements for the orientation of the first and second directions. In other words, the conductors need not necessarily be perpendicular to one another, though a perpendicular arrangement may provide ease of calculation of the position of a user touch. Moreover, the conductors need not be oriented in vertical and horizontal directions, though such orientation is shown in the described embodiments.

The plurality of first conductors and the plurality of second conductors are disposed such that they do not directly electrically couple to one another. In some embodiments, this is accomplished by separating the first and second layers with a dielectric material, such as an air gap, a material such as $SiO_2$, a polymer substrate, a bond material, and the like. In other embodiments, the first portion of the conductor pattern 202 and the second portion of the conductor pattern 202 are disposed on the same layer or otherwise in substantially the same plane, and known techniques are utilized for connecting elements to form the conductors. These techniques can include traces, vias, bond wires, and the like, which ensure that the first portion of the conductor pattern does not directly come into contact with the second portion of conductor pattern.

In some embodiments, an active surface area of the touchscreen 201 covers a slightly smaller portion of the touchscreen 201. For example, a border 203 around the active surface area of the touchscreen 201 may be employed, which either contains no conductors, or otherwise does not register touches within the border 203 despite the presence of conductors.

The illustrated embodiment 200 includes a signal measurement device 210, which is employed both to provide a signal to the conductor pattern 202 and to detect a change in the signal being provided to the conductor pattern 202. The signal measurement device 210 operates cooperatively with a conductor selector 212. The conductor selector 212 may be relatively simple, such as a multiplexer (MUX) that selects one of a plurality of conductors of the conductor pattern 202 to couple to the signal measurement device 210. The conductor selector 212 receives a row or column select signal 205 to determine which row and/or column to couple to the signal measurement device. As will be discussed further below, some embodiments of the signal measurement device 210 combine a MUX with other circuitry to form a conductor selector 212 that enables multiplexing readings from more than one conductor of the conductor pattern 202 to the signal measurement device 210 at once. The complexity of the conductor selector 212 determines the type and format of the row or column select signal 205.

The conductor selector 212 is coupled to a number of columns (illustrated as M columns) of the conductor pattern 202 via a bus, and is also coupled to a number of rows (illustrated as N rows) of the conductor pattern 202 via a separate bus. The conductor selector 212 receives a row or column select signal 205, and couples the signal measurement device 210 to the indicated conductor(s) of the conductor pattern 202. This coupling allows the signal measurement device 210 to apply a signal to the conductor(s) and detect changes in the applied signal.

When a user interacts with the touchscreen 201, an increased capacitance is introduced corresponding to the location of the user's interaction. This increased capacitance introduces a reduced impedance path at the location of the user's interaction and will incur a change in the signal provided to at least one associated row and column. By providing a signal to each of the rows and columns of the conductor pattern 202 of the touchscreen 201 in turn, and by detecting changes in the applied signals, the location of the user's interaction with the touchscreen 201 can be detected. By detecting a change in a signal provided to a particular row and by separately detecting a change in a signal provided to a particular column, an intersection of the identified row and column can provide a calculated estimate of the location of the user's interaction with the touchscreen.

In some embodiments, the application of signals to the conductors need not be purely successive in nature. For example, a signal need not necessarily be applied to row 1, then to row 2, then to row 3, etc. Instead, a signal may be applied to row 1, then to row 8, then to row 2, etc. As another example, a signal may be applied initially to every Nth row (where N is an integer), and then the signal may be applied to every row between 1 and N−1, then to rows N+1 to 2N−1, and so on.

Figure 3:
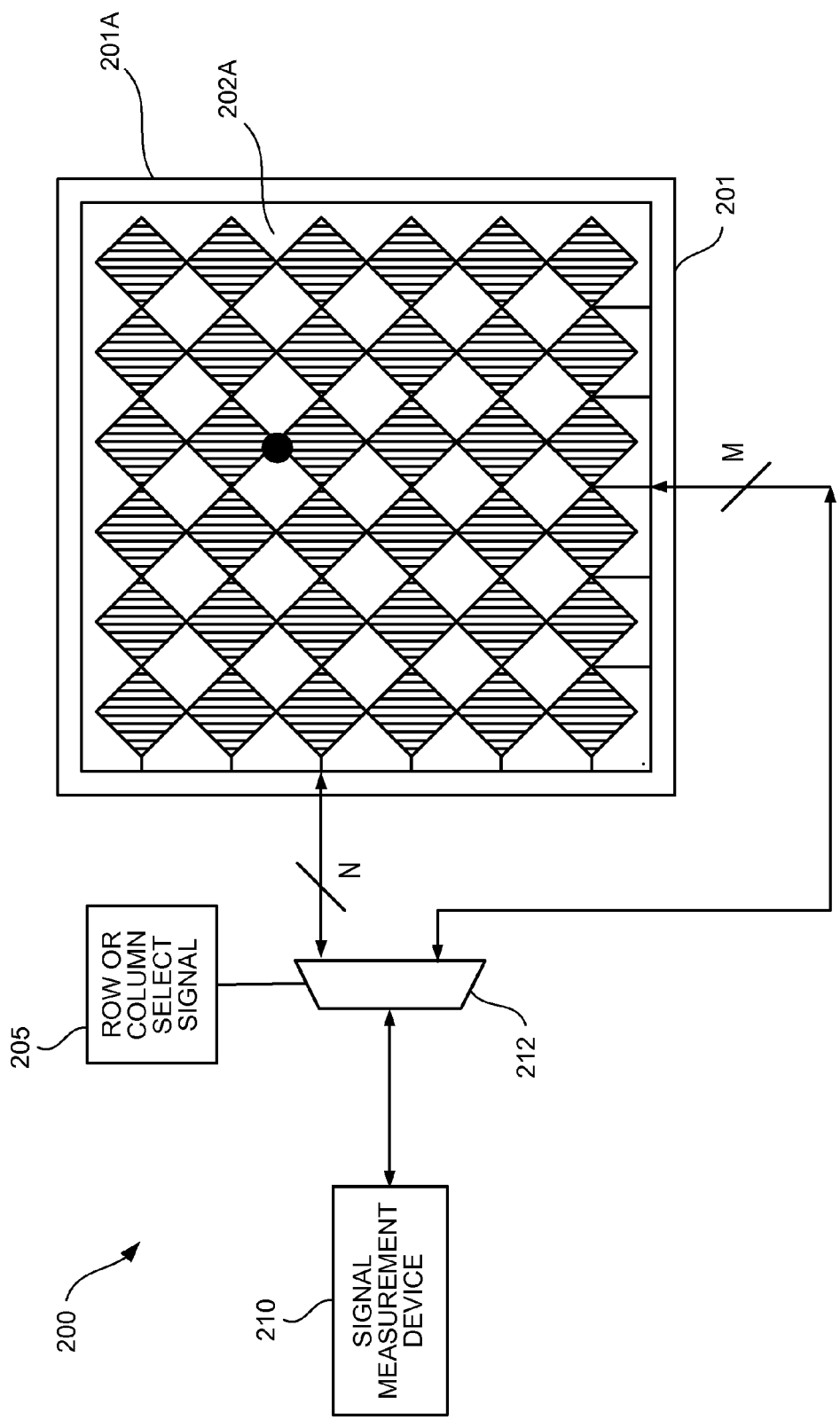
FIG. 3 illustrates an embodiment of a touch-sensitive input device having two pluralities of diamond-shaped conductors.

FIG. 3 illustrates a touchscreen 201A having a conductor pattern 202A comprising conductors of repeated square or diamond shapes. A plurality of repeated diamond-shaped conductors is arranged horizontally across the touchscreen 201A to form rows, as illustrated by the shaded portions of the conductor pattern 202A. Similarly, a plurality of repeated diamond-shaped conductors is arranged vertically across the touchscreen 201A to form columns. The conductors of the rows and the conductors of the columns are spaced apart from each other by an amount appropriate to eliminate unwanted cross-effects between the conductors. When the diamond-shaped conductors of the rows are connected to each other with the known techniques described above, and the diamond-shaped conductors of the columns are likewise connected to each other, such a conductor pattern 202A may be disposed in a single layer of the touchscreen 201A.

Though only two styles of conductors have been illustrated, the shapes and widths of the various conductors of a touchscreen 201 can be altered to change the signal response of the conductors, without departing from the scope and spirit of the invention. For example, in the pattern of conductors illustrated in FIG. 3, a linear movement of a user's touch across the active area of the touchscreen introduces non-linearity in the signal response of signals used to detect such user's interaction, due to the diamond-shaped pattern of conductors. Since a larger pitch exists between conductors within this conductor pattern 201A, the number of different pads below the contact point is reduced and thus provides a "stair step" response in relation to the user's movement or location identification. Increasing touch area size to correspond with the increases in pitch also produces an energy non-uniformity (e.g., extending normal to the surface of the touchscreen or in the Z-axis direction if the X and Y axes are deemed to be the touchscreen surface) between rows and columns that makes it more difficult to set touch/no-touch thresholds within a touchscreen system.

In some applications, the signal response would be improved if it were as smooth and linear as possible. One embodiment utilizes a conductor pattern such as that described in co-pending and co-owned U.S. patent application Ser. No. 12/333,473, filed Dec. 12, 2008, entitled "Architecture and Method for Multi-Aspect Touchscreen Scanning," which is incorporated herein by reference in its entirety. This incorporated publication describes an intermeshing saw-tooth conductor pattern that provides greater signal uniformity than some of the other patterns described herein. This incorporated publication also describes a system and method for increasing the precision of a detected touch location when a single touch is registered on more than one adjacent conductor such as, for example, when a finger is so wide compared to the conductors that more than one conductor is touched at a time. These methods can be used along with embodiments of the systems and methods described herein to more precisely determine detected touch locations.

Figure 4A:
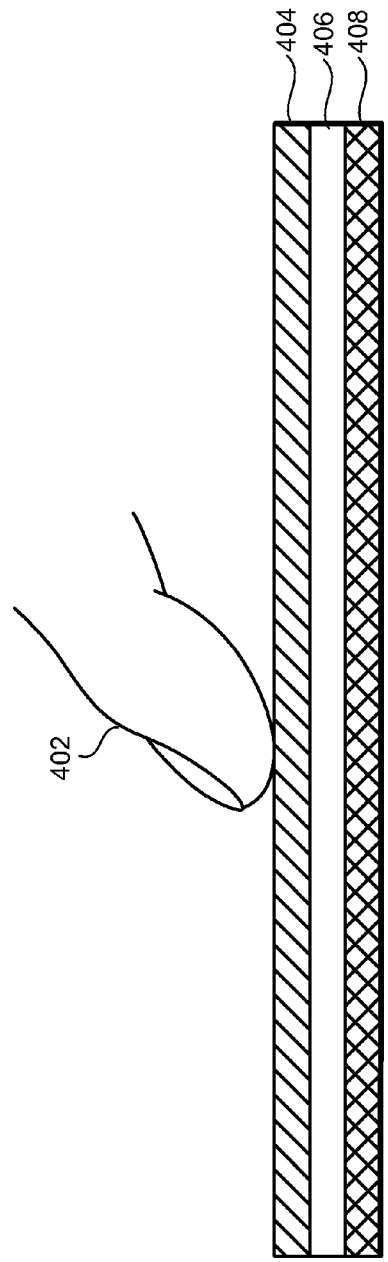
FIG. 4A illustrates an embodiment of placement of conductor patterns within a touchscreen.

FIG. 4A illustrates an exemplary embodiment of placement of conductor patterns within the layers of a touchscreen. The first conductors 404 are disposed as a top layer of the touchscreen, and can be directly touched by a user's finger 402 when interacting with the touchscreen. The second conductors 408 are disposed as a bottom layer of the touchscreen. A dielectric layer 406 separates the first conductors 404 and second conductors 408. As described above, the dielectric layer 406 can be any suitable dielectric including but not limited to air, semiconductor materials including $SiO_2$, polymer substrate materials, bond materials, and the like.

Figure 4B:
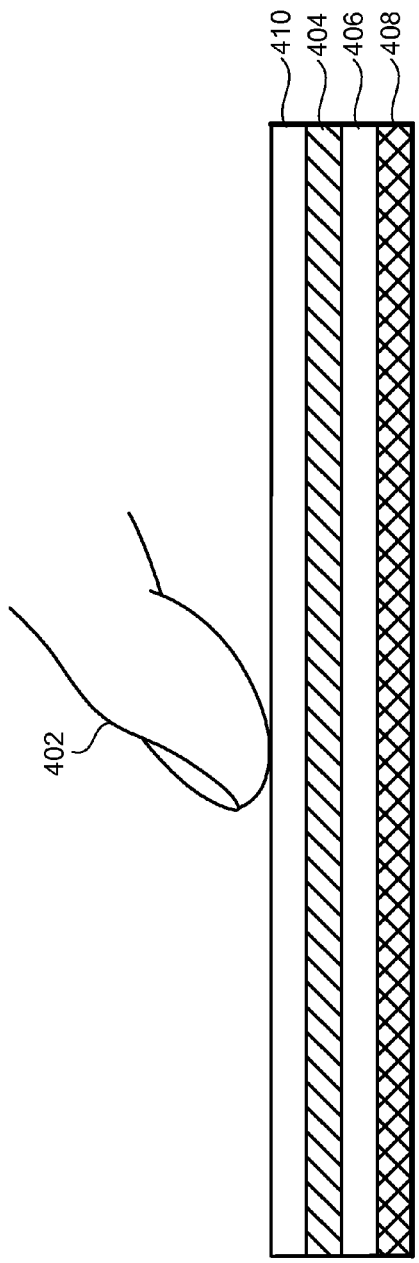
FIG. 4B illustrates an alternative embodiment of placement of conductor patterns within a touchscreen.

FIG. 4B illustrates an alternative embodiment of placement of conductor patterns within the layers of a touchscreen. Specifically, an additional touchscreen surface layer 410 (e.g., a polymer layer, a protective layer, or otherwise) is disposed on top of the top layer of conductors such that a user does not directly touch the top layer of conductors. Any material suitable for forming a touchscreen surface that allows user interaction with the plurality of first and second conductors as described herein can be used, including, but not limited to, a polymer layer, a protective layer, an oleophobic layer, and the like.

Some touch-sensitive input devices, often described as "multi-touch input devices," are capable of detecting more than one simultaneous touch. When using one of the embodiments of a touch-sensitive input device described above, wherein the location of a touch is determined by finding the intersection of a touched first conductor on a first axis and a touched second conductor on a second axis, multiple simultaneous touches can lead to problems in determining the actual touch locations.

In previous multi-touch input devices, actual touch points could be distinguished from ghost points by performing cross-point scanning. In cross-point scanning, a signal is applied to a first conductor on a first axis, and is detected on a second conductor on a second axis. The embodiments described below are an improvement over an embodiment that utilizes cross-point scanning for multiple reasons. For example, the embodiments described below require less complicated sensing devices than those used in cross-point scanning, which can save construction cost, decrease size, and improve speed and durability. As another example, some of the embodiments described below can be built upon readily available commodity hardware configured to provide capacitance signals and to allow such signals to be muxed together before sampling, such as a Cypress PSoC CY8C24x94 touch sensor, available from Cypress Semiconductor Corporation.

Figure 5A:
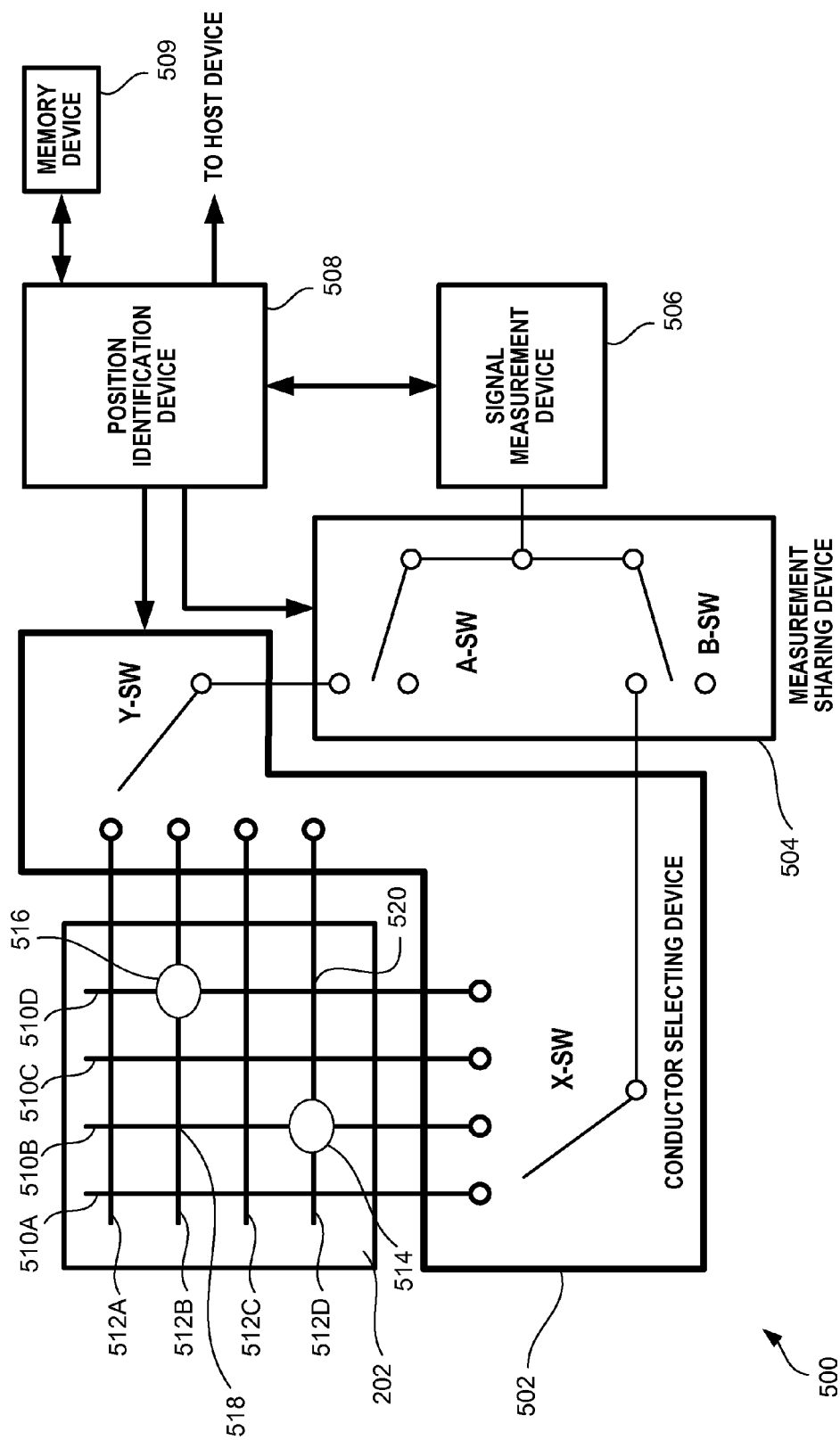
FIGS. 5A and 5B are functional block diagrams of embodiments of a touch-sensitive input device for performing combined measurements of a first plurality of conductors and a second plurality of conductors at once.

FIG. 5A illustrates an exemplary embodiment of a touch-sensitive input device capable of detecting multiple simultaneous touches. The conductor pattern 202 is illustrated with four conductors 510A-D on a first axis (X-axis) and four conductors 512A-D on a second axis (Y-axis). A first touch location 514 and a second touch location 516 are indicated in the diagram with ellipses.

As discussed above, a scan of the conductors on the first axis would indicate that a touch is occurring on conductor 510B and on conductor 510D. A scan of the conductors on the second axis would indicate that a touch is occurring on conductor 512B and on conductor 512D. The problem occurs when attempting to determine which of the intersections of conductors 510B, 510D, 512B, and 512D indicate actual touch points. Without further information, a position identification device 508 would not be able to distinguish intersections that correlate with actual touch points 514, 516 from the intersections that do not correlate with actual touch points 518, 520, also known as ghost points.

The touch-sensitive input device 500 illustrated in FIG. 5A is configured to distinguish actual touch points 514, 516 from ghost points 518, 520. The conductor pattern 202 is connected to a conductor selecting device 502. Conductor selecting device 502, together with measurement sharing device 504, perform operations similar to those performed by the conductor selector 212 of FIG. 6, and the N:2 MUX 716 of FIGS. 7A and 8 (both described further below), to select one or more conductors of the conductor pattern 202 to couple to the signal measurement device 506. Signal measurement device 506 performs operations similar to the operations performed by signal measurement device 210 described above to obtain readings from conductors of the conductor pattern 202. This includes multiplexed readings from more than one conductor, such as one conductor from the X-axis and one conductor from the Y-axis at the same time. The X-Switch (X-SW) is operable to couple the measurement sharing device 504 to one of the conductors in the first direction 510A-510D, and the Y-Switch (Y-SW) is operable to couple the measurement sharing device 504 to one of the conductors in the second direction 512A-512D. In one embodiment, each of the X-Switch and the Y-Switch are implemented using an N:2 MUX as described above.

Measurement sharing device 504 is operable to couple one of the X-Switch, the Y-Switch, or both to the signal measurement device 506. The A-Switch (A-SW) of the measurement sharing device 504, when actuated, couples the Y-Switch to the signal measurement device 506. The B-Switch (B-SW) of the measurement sharing device 504, when actuated, couples the X-Switch to the signal measurement device 506.

Position identification device 508 is coupled to the conductor selecting device 502, the measurement sharing device 504, and the signal measurement device 506. Position identification device 508 is operable to instruct the X-Switch, the Y-Switch, the A-Switch, and the B-Switch which conductors to couple to the signal measurement device 506 at a given time.

In one embodiment, the signals received from the conductor pattern 202 by the conductor selecting device 502 and the measurement sharing device 504 are handled as current signals. Advantageously, the use of a current signal allows the Y-Switch and the X-Switch to be coupled together by the measurement sharing device 504 for coupling to the signal measurement device 506, and allows such a combined conductor to be energized and measured by the signal measurement device 506 in the same way as a single conductor.

As described below with respect to FIG. 8, the position identification device 508 receives a digital representation of the capacitance measurements made by the signal measurement device 506. Position identification device 508 is also coupled to a memory device 509. When position identification device 508 obtains a measurement of one or more conductors, it stores that measurement in the memory device 509. Memory device 509 comprises any type of computer-readable memory medium known in the art, such as RAM, registers, flash memory, and the like. The position identification device 508 then performs further processing on the measurements to determine actual touch points, and transmits the determined locations of actual touch points to a host device (not pictured).

In operation, position identification device 508 instructs the A-Switch and the Y-Switch to couple each of the conductors 512A-512D to the signal measurement device 506 in turn, while the B-Switch and the X-Switch are open. Position identification device 508 takes the obtained measurements to determine one or more maximum values, which indicate the presence of a touch associated with the conductor, and stores the values in the memory device 509. In the illustrated example, a maximum value would be found for conductor 512B and for conductor 512D. Position identification device 508 then instructs the A-Switch and the Y-Switch to open, and for the B-Switch and the X-Switch to couple each of the conductors 510A-510D to the signal measurement device 506 in turn. Position identification device 508 again takes the obtained measurements to determine one or more maximum values, which indicate the presence of a touch associated with the conductor, and stores the values in the memory device 509. In the illustrated example, a maximum value would be found for conductor 510B and for conductor 510D.

Next, position identification device 508 chooses one of the four identified conductors on which to perform further testing. In one embodiment, the conductor having the highest measurement value is chosen, but the conductor may be chosen by any other suitable method, such as choosing the conductor with the highest measurement value on only a single axis. In one example shown in FIG. 5A, conductor 510B would be found to have the highest measurement value, and is chosen. The position identification device 508 instructs the B-Switch and the X-Switch to couple conductor 510B to the signal measurement device 506. The position identification device 508 then instructs the A-Switch to also couple conductor 512B to the signal measurement device 506, and a combined measurement is taken and stored in the memory device 509. The combined measurement is performed by the same device as performs the measurement of a single conductor, but more than one conductor is coupled to the signal measurement device 506 at once to obtain the combined measurement. Further, though one conductor from each axis is coupled to the signal measurement device 506 at once, the measured capacitance of the combined measurement will be different than the measurements of the individual conductors measured separately and added together. The position identification device 508 next instructs the Y-Switch to decouple conductor 512B from the signal measurement device 506, and to instead couple conductor 512D to the signal measurement device 506. At this point, another combined measurement is taken and stored in the memory device 509.

When a combined measurement at a given intersection is subtracted from a sum of the individual measurements of conductors at the given intersection, the result will typically be at least one and a half times greater when the intersection is an actual touch point versus a ghost point. This characteristic is used by the position identification device 508 to determine which of the intersections to report as actual touch points to the host device.

Figure 5B:
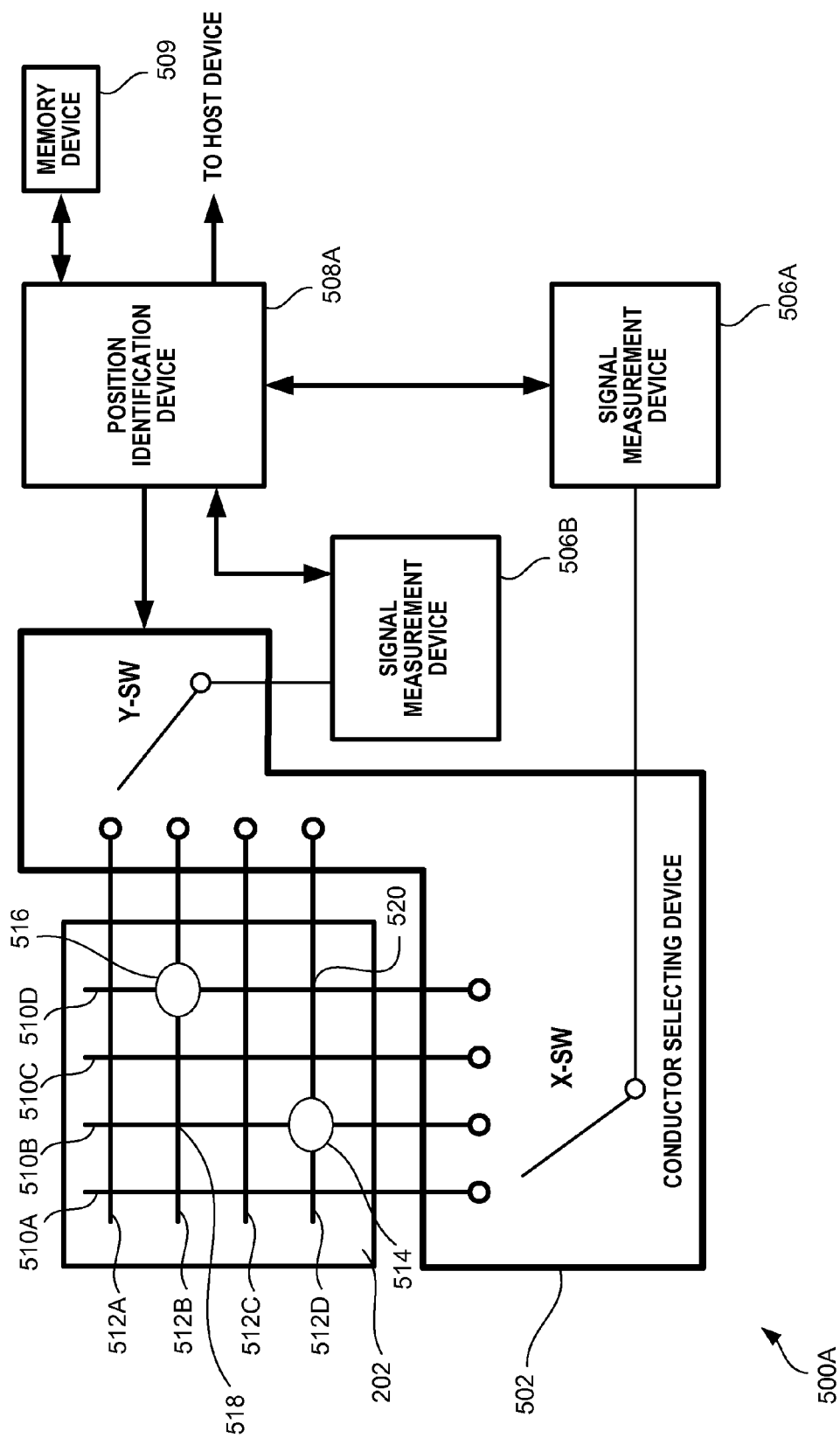

FIG. 5B illustrates another embodiment of a touch-sensitive input device 500A capable of detecting multiple simultaneous touches. Similar to the embodiment illustrated in FIG. 5A, a conductor pattern 202 includes four conductors 510A-D on a first axis (X-axis) and four conductors 512A-D on a second axis (Y-axis). A first touch location 514 and a second touch location 516 are indicated. The touch-sensitive input device 500A also includes a conductor selecting device 502 having an X-Switch (X-SW) and a Y-Switch (Y-SW) similar to those discussed above with respect to FIG. 5A.

Unlike the embodiment illustrated in FIG. 5A, the touch-sensitive input device 500A of FIG. 5B omits the measurement sharing device 504, and instead includes a first signal measurement device 506A coupled to the X-Switch of the conductor selecting device 502, and a second signal measurement device 506B coupled to the Y-Switch of the conductor selecting device 502. Each of the signal measurement devices 506A, B is coupled to the position identification device 508A, and is configured to supply a signal to a conductor selected by the conductor selecting device 502 and to measure an electrical characteristic of the selected conductor.

The position identification device 508A instructs the X-Switch to couple one of the conductors in the first direction 510A-D to the first signal measurement device 506A, and instructs the Y-Switch to couple one of the conductors in the second direction 512A-D to the second signal measurement device 506B. The first signal measurement device 506A and the second signal measurement device 506B each apply a signal to the respectively coupled conductor at the same time, and the electrical characteristic of one of the conductors is measured and transmitted to the position identification device 508A for further processing.

To identify actual touch points in FIG. 5B, the conductor selecting device 502 couples the first signal measurement device 506A to a first conductor 510B on the X-axis, and couples the second signal measurement device 506B to a first conductor 512B on the Y-axis. Both the first and second signal measurement devices 506A, B apply a signal to the associated conductors to energize them simultaneously. The first signal measurement device 506A then measures an electrical characteristic (such as capacitance) of the first conductor 510B, and transmits the resulting reading to the position identification device 508A. Next, the conductor selecting device 502 couples the second signal measurement device 506B to a second conductor 512D on the Y-axis, and both the first and second signal measurement devices 506A, B apply a signal to the associated conductors to energize them simultaneously. The first signal measurement device 506A again measures an electrical characteristic of the first conductor 510B, and transmits the resulting reading to the position identification device 508A. Using the difference between these readings, the position identification device 508A determines which of the points 514 and 518 is an actual touch point, and by logic determines which of the points 516, 520 is an actual touch point.

Figure 6:
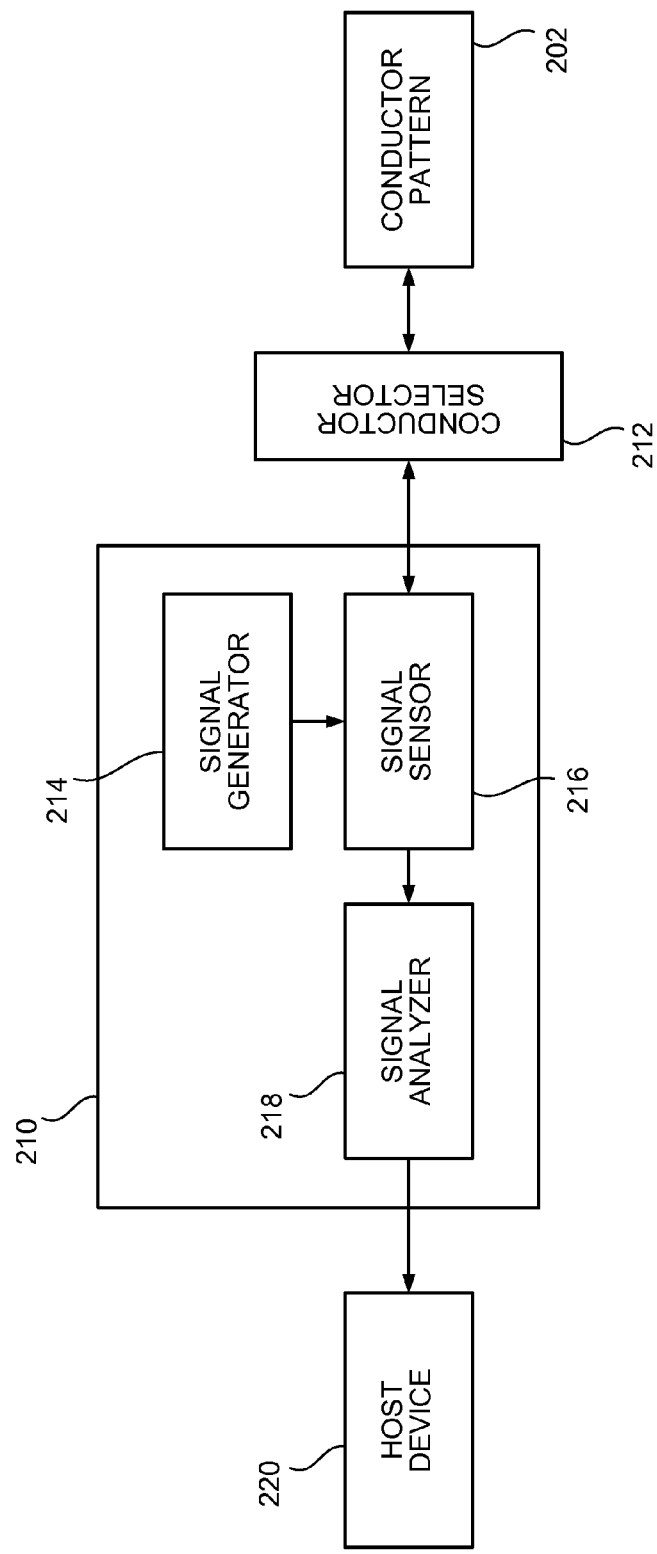
FIG. 6 illustrates a functional block diagram of components of an exemplary embodiment of a touch-sensitive input device.

FIG. 6 is a logical block diagram illustrating further details of an embodiment of a signal measurement device 210. Embodiments of signal measurement device 506, illustrated in FIGS. 5A and 5B, contain similar features. The signal measurement device 210 includes a signal generator 214, a signal sensor 216, and a signal analyzer 218. The signal generator 214 generates a signal and provides it to the signal sensor 216. The signal can be a constant voltage, a particular wave form, or any other signal capable of being detectably altered when the capacitance of an associated conductor is changed.

The conductor selector 212, similar to the conductor selector 212 illustrated above in FIGS. 2 and 3, is configured to selectively couple the signal sensor 216 to one or more conductors of the conductor pattern 202. This coupling serves to include the coupled conductors in a signal sensing circuit of the signal sensor 216, so that the signal sensor 216 can detect changes in capacitance of the conductors. The signal sensor 216 passes a detection signal to the signal analyzer 218. The detection signal can be the signal generated by the signal generator 214 and altered by the coupling to the conductor pattern 202, or can be a further processed signal that indicates the presence or absence of touch. The signal analyzer 218 is configured to process the signal from the signal sensor 216 to determine whether the coupled conductor or conductors are sensing a touch, and passes its determination to a host device 220.

FIG. 7A is a functional block diagram illustrating an exemplary embodiment of signal generation and detection circuitry 700 for detecting touch on a touch-sensitive input device. This circuit 700 is an example of an appropriate design to be included within the signal sensor 216 of FIG. 6. The circuit 700 includes amplification circuitry 704 that, based on an input signal, generates an output signal and a feedback signal. Amplification circuitry 704 is coupled to receive the input signal $V_{signal}$ from a signal generator 214. More specifically, input signal $V_{signal}$ is received at a positive input of amplification circuitry 704. Further, a parallel combination of a capacitor C and a resistor R, of any desired sized values, are coupled between an output of amplification circuitry 704 and a negative input of the amplification circuitry 704. Accordingly, a feedback signal is coupled from the output of amplification circuitry 704 to the negative input. The feedback signal is also coupled to the conductor selector 212 illustrated above in FIGS. 2, 3, and 5. In FIG. 7A, the conductor selector 212 is illustrated as an N:2 MUX, element 716. The conductor selector 212 is configured to couple the negative input of the amplification circuitry 704, and hence the feedback signal, to a first conductor of a plurality of first conductors, to a second conductor of a plurality of second conductors, or to one of each. When the conductor selector 212 couples one of the conductors on the X-axis and one of the conductors on the Y-axis at once to the amplification circuitry 704, the output of the amplification circuitry 704 is a combined output. The output of amplification circuitry 704 is also coupled to a positive input of an additional amplification circuitry 712.

As noted above, the feedback signal is provided to one of the conductors of the conductor pattern 202 as an input signal for a touch-sensitive input device. More specifically, the feedback signal is provided to a conductor by way of a conductor selector 212 such as N:2 MUX 716. "N" represents a number of conductors to which one side of the N:2 MUX 716 is coupled. "2" represents a number of inputs to the N:2 MUX 716 to which each conductor is selectively coupled. As illustrated, the two inputs to the N:2 MUX 716 are the feedback signal from the amplification circuitry 704 and a ground potential level.

In one embodiment, the N:2 MUX 716 is connected to only the rows of the conductor pattern 202, and an additional N:2 MUX (not pictured) is included in the conductor selector 212 to selectively couple the feedback signal to the columns of the conductor pattern 202. This additional N:2 MUX is omitted from the illustration for clarity. In yet another embodiment, a single N:2 MUX 716 is connected to both the rows of the conductor pattern 202 and the columns of the conductor pattern 202. In this embodiment, the N:2 MUX 716 can connect both a row and a column of the conductor pattern 202 to the feedback signal at the same time, if desired, to create a combined output.

The N:2 MUX 716 is configured to couple the feedback signal to a selected conductor of the conductor pattern 202, and to couple all of the non-selected conductors of the conductor pattern 202 to a ground potential level. In other words, in one embodiment, each of the conductors coupled to the N:2 MUX 716 is coupled to the ground potential level or to the feedback signal at any given time. In one embodiment, at most one of the conductors is coupled to the feedback signal at any given time, at which time all of the other conductors connected to the N:2 MUX 716 are coupled to the ground potential level. In other embodiments, two or more conductors connected to the N:2 MUX 716 could be coupled to the feedback signal at a given time, during which all of the other conductors connected to the N:2 MUX 716 would be coupled to the ground potential level, to effectuate a larger surface area of conductive material. For example, two or more conductors, which may or may not be adjacent, could effectively operate as one conductor. In yet other embodiments described further below, one conductor connected to the N:2 MUX 716 and a conductor connected to an additional N:2 MUX (not pictured) could be coupled to the feedback signal at once, to couple both a row conductor and a column conductor to the signal sensor 216. Signal generator 214 is operable to produce one of a plurality of input signal types according to a control command that is based upon a mode of operation.

When a user is touching the touch-sensitive input device, and, more particularly, when a user is touching a portion of the touch-sensitive input device that overlaps a conductor to which the feedback signal is being produced, a signal characteristic of the feedback signal changes because of a change in capacitance of the conductor with which the user is interacting. The change in capacitance thus changes a signal characteristic (e.g., signal current, voltage, frequency characteristics, or other property) of the feedback signal. The output of amplification circuitry 704 therefore represents the sum of a signal $IR_{touch}$ (that is, an amplified change to the input signal caused by the change in capacitance) and the original input signal $V_{signal}$.

In operation, a user's touch increases the total capacitance (thereby reducing impedance) for the conductor being touched, which thereby increases a current of the input signal. The current is pulled through the feedback resistor, R, causing a voltage drop. The amplification circuitry 704 produces an increased magnitude signal to keep both the positive and negative inputs of the amplification circuitry 704 constant. Thus, the amplification circuitry 704 output signal includes a component that results from the touch that is characterized as $IR_{touch}$.

The signal generation circuitry 700 for detecting a touch of a touch-sensitive input device also includes a second amplification circuitry 712 that produces a response signal based on a difference between the input signal provided by signal generator 214 and the output signal of first amplification circuitry 704, wherein the response signal corresponds to a user's interaction with the touch-sensitive input device. More specifically, amplification circuitry 712 produces the signal $IR_{touch}$. Second amplification circuitry 712 is coupled to receive the output of first amplification circuitry 704 as well as the input signal $V_{signal}$ provided by signal generator 214. The input signal $V_{signal}$ provided by signal generator 214 is received at a negative input of second amplification circuitry 712 while the output of the first amplification circuitry 704 is received at a positive input of second amplification circuitry 712. The output of second amplification circuitry 712 therefore is equal to the component $IR_{touch}$, because the input signal has been cancelled (subtracted) from the output of first amplification circuitry 704 that includes $IR_{touch}$ as well as input signal $V_{signal}$. The output of second amplification circuitry 712 is subsequently passed to the signal analyzer 218, which processes the signal to indicate to the host device 220 which conductor is being touched.

FIG. 7B is a signal diagram 750 that illustrates operation of signal generation and detection circuitry 700 for detecting touch on a touch-sensitive input device according to an exemplary embodiment. A first signal, which represents the output of first amplification circuitry 704, is the sum of $IR_{touch}$ and $V_{signal}$. The input signal $V_{signal}$ is shown also. Accordingly, the difference between the two signals is the signal $IR_{touch}$. Without a user's touch of the touch-sensitive input device changing the capacitance of the conductor, the output of first amplification circuitry 704 is merely $V_{signal}$. An increase in capacitance resulting from a touch, however, increases a magnitude of the signal of the input signal, thus creating the component $IR_{touch}$.

FIG. 7C is a signal diagram 760 that illustrates operation of signal generation and detection circuitry 700 for detecting touch on a touch-sensitive input device according to another embodiment. This embodiment is somewhat analogous to the previous diagram, with at least one difference being that the signal $IR_{touch}$ and $V_{signal}$ also includes some phase shift when compared to the input signal $V_{signal}$. In other words, not only may the amplitude of the signal $IR_{touch}$ and $V_{signal}$ have some amplitude difference when compared to the input signal $V_{signal}$, but it may also have incurred some phase shift relative to the input signal $V_{signal}$. Either one or both of the amplitude and phase of the $IR_{touch}$ and $V_{signal}$ may be employed to identify a user's interaction with the touch-sensitive input device.

Generally, it is noted that the signal generated by signal generator 214 can have any desired characteristics in terms of amplitude, frequency, shape, and/or any other parameter as desired for a given embodiment. Certain embodiments may employ sinusoidal shaped signals, others may employ rectangular or square shaped signals, etc. Clearly, different instantiations of signal generator 214 (or any other signal generator or signal generator/detector as described herein) may employ signals having different characteristics as well, without departing from the scope and spirit of the invention.

Figure 8:
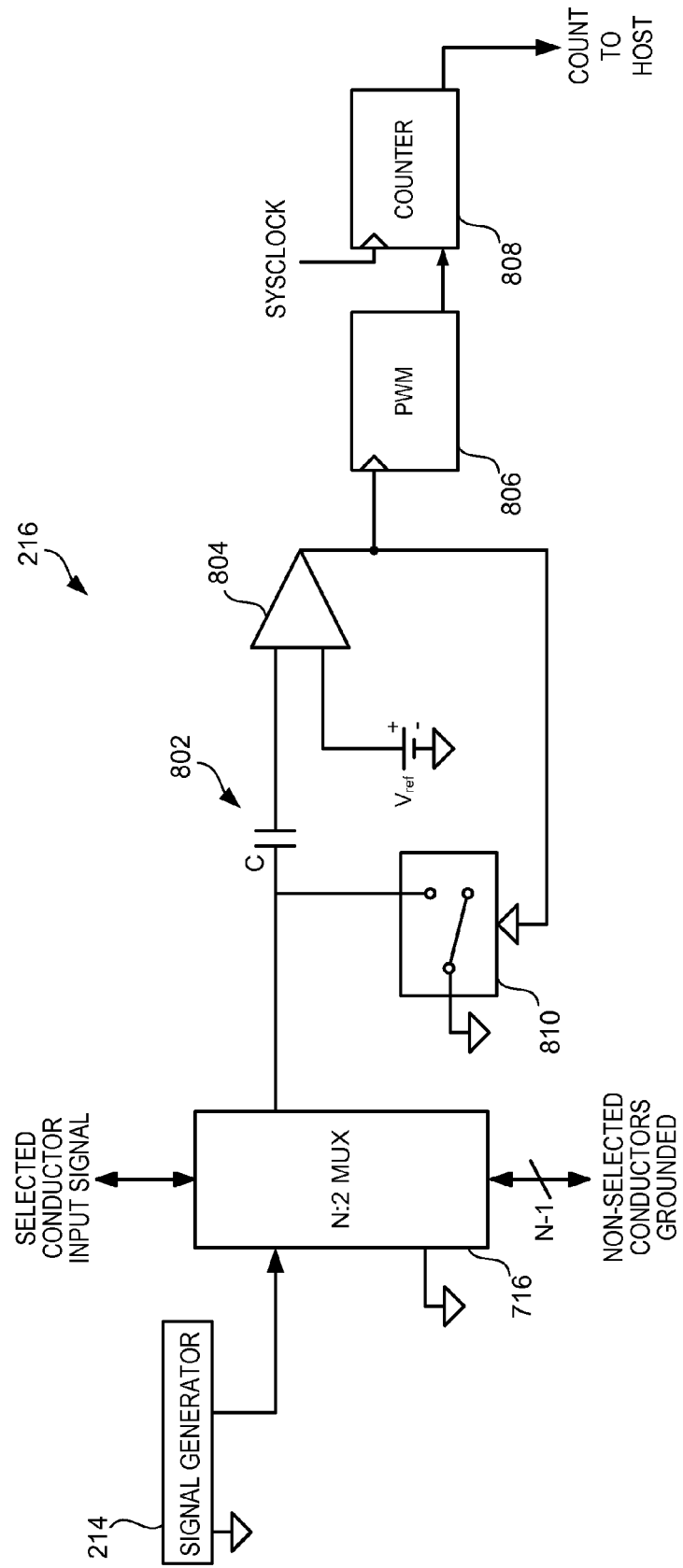
FIG. 8 is a functional block diagram of signal generation and detection circuitry for detecting touch on a touchscreen according to an embodiment of the invention utilizing a relaxation oscillator and an analog-digital converter.

An additional embodiment of the signal sensor 216 is illustrated in FIG. 8. The signal sensor 216 in the illustrated embodiment is configured to perform an analog-to-digital conversion before providing a digital count representing a measured capacitance for upstream processing. Broadly, a relaxation oscillator measures the amount of time it takes for a capacitor to charge to a given voltage, and provides that measure of time as a measure of the capacitance. The relaxation oscillator is coupled to the input signal and one or more conductors of the conductor pattern 202, and converts the measurement of capacitance into a train of digital pulses which can be counted to produce a digital measurement of capacitance.

The signal generator 214 is configured to provide a constant current to the relaxation oscillator, which is selectively coupled by the N:2 MUX 716 (or other conductor selector 212) to one or more conductors of the conductor pattern 202. The N:2 MUX 716 is coupled to a capacitor 802, which is coupled to one input of a comparator 804. The other input of the comparator 804 is coupled to a reference voltage. While the voltage of the capacitor 802 is less than the reference voltage, the comparator 804 outputs a low signal. Once the voltage of the capacitor 802 exceeds the reference voltage, the comparator 804 is tripped, and outputs a high signal. This high signal actuates reset switch 810, which connects the capacitor 802 to ground and allows the charge on the capacitor 802 to dissipate. Once the charge on the capacitor 802 has dissipated, the reset switch 810 returns to its original state, the comparator 804 again outputs its low signal.

If N:2 MUX 716 is not coupled to any conductors of the conductor pattern 202, the amount of time between successive high signals from the comparator 804 will be determined on the capacitance of capacitor 802. Once N:2 MUX 716 is coupled to a conductor of the conductor pattern 202, the amount of time between successive high signals from the comparator 804 will be determined by the total capacitance of the capacitor 802 and the coupled conductor of the conductor pattern 202. When the capacitance rises, the amount of time between successive high signals will increase, because it will take a longer time for the combined capacitors to reach the reference voltage. By measuring this time, the capacitance of the coupled conductor is determined. When this capacitance is higher than a baseline value, a touch is detected.

One way to measure the time is through the combination of a pulse width modulator (PWM) and a counter. As illustrated, the clock input of a PWM 806 is coupled to the output of the comparator 804. The PWM 806 is configured to generate a high output for a fixed number of pulses received from the comparator 804. The output of the PWM 806 is coupled to an enable input of a counter 808, which is also coupled to a system clock signal. While the output of the PWM 806 is high, the counter 808 is incremented once for each system clock cycle. Once the output of the PWM 806 returns to the low value, the value of the counter 808 is transmitted to the host, and is representative of the number of clock cycles it took for the capacitor 802 to reach the reference voltage. In this way, the capacitance of the coupled conductor of the conductor pattern 202 can be measured and transmitted as a digital value.

The system described above in FIG. 5A may be used to perform a method for detecting actual touch points. Generally, one embodiment of such a method includes determining a first location and a second location on a first axis at which a touch is indicated and determining a first location and a second location on a second axis at which a touch is located. Then, the first location on the first axis and the first location on the second axis are multiplexed to perform a first combined measurement, as are the first location on the first axis and the second location on the second axis to perform a second combined measurement. Separate measurements performed at the first location and second location on the first axis and separate measurements performed at the first location and the second location on the second axis are compared to the first combined measurement and the second combined measurement. The touch points determined by the comparison can then be transmitted to a host device.

In one embodiment, the first combined measurement and the second combined measurement are compared directly to each other to determine the actual touch points, and the separate measurements are ignored. One reason for this is that, in one embodiment, the separate measurements are relatively small compared to the combined measurements, and can therefore safely be ignored.

In another embodiment, additional combined measurements are taken and compared to enhance sensitivity. For example, the first combined measurement at the first location on the first axis and the first location on the second axis is combined with a combined measurement at the second location on the first axis and the second location on the second axis, and the second combined measurement at the first location on the first axis and the second location on the second axis is combined with a combined measurement at the second location on the first axis and the first location on the second axis. Since both tested points in each case are either actual touch points or ghost points, the difference between the combined scores will be even greater, thus providing greater detector sensitivity.

Figure 9A:
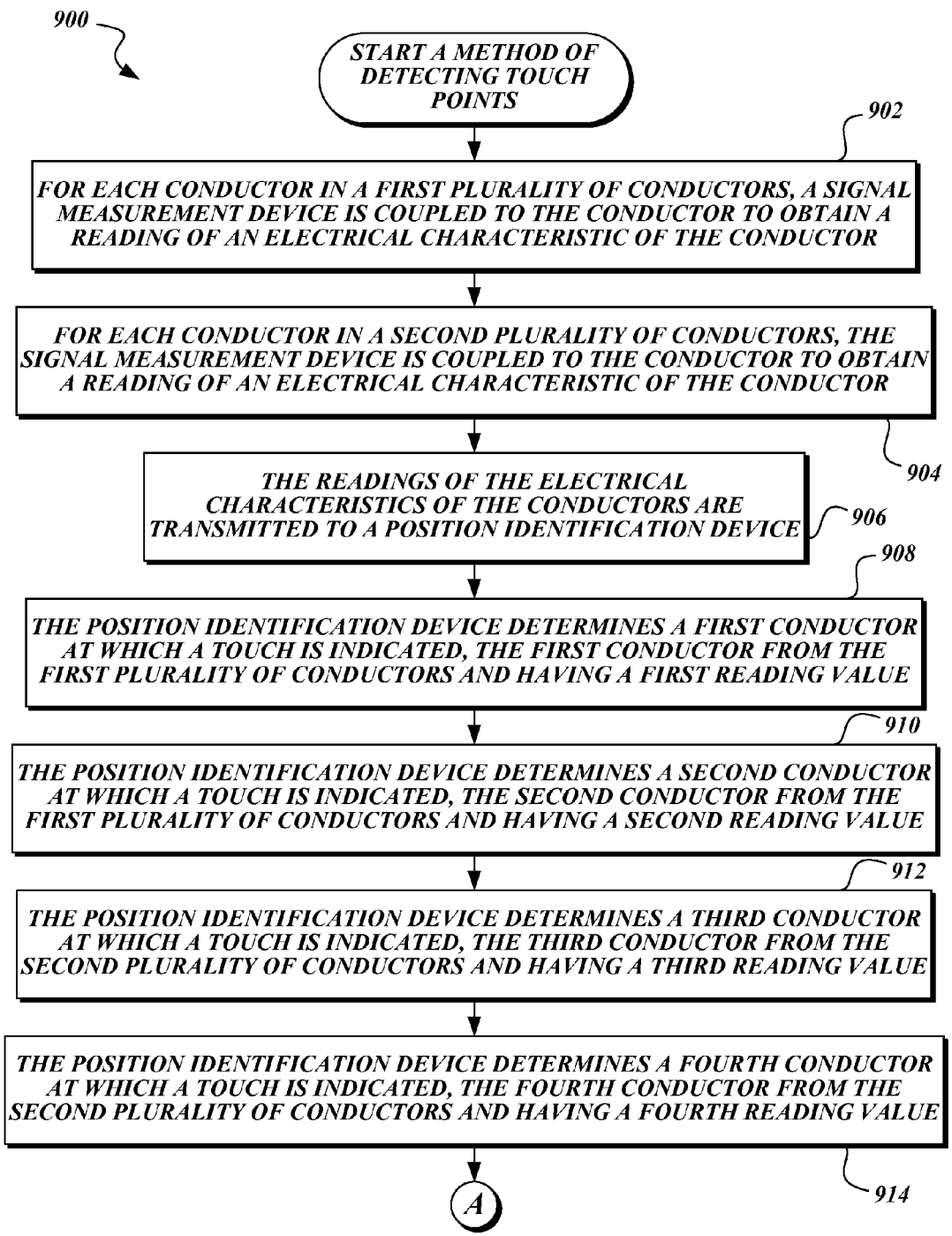
FIGS. 9A-9C illustrate an exemplary embodiment of a method for detecting touch points by performing combined measurements.
Figure 9B:
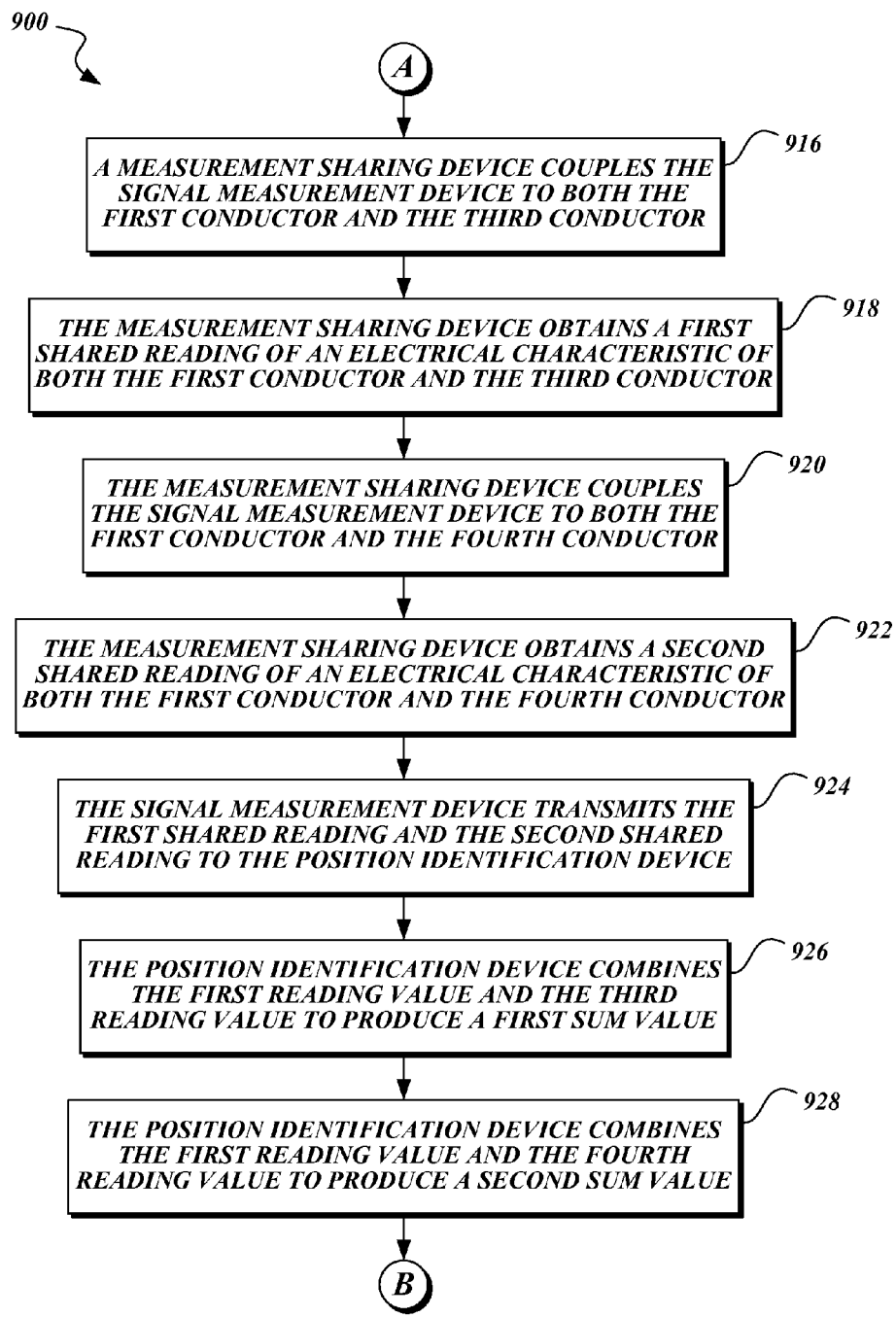
Figure 9C:
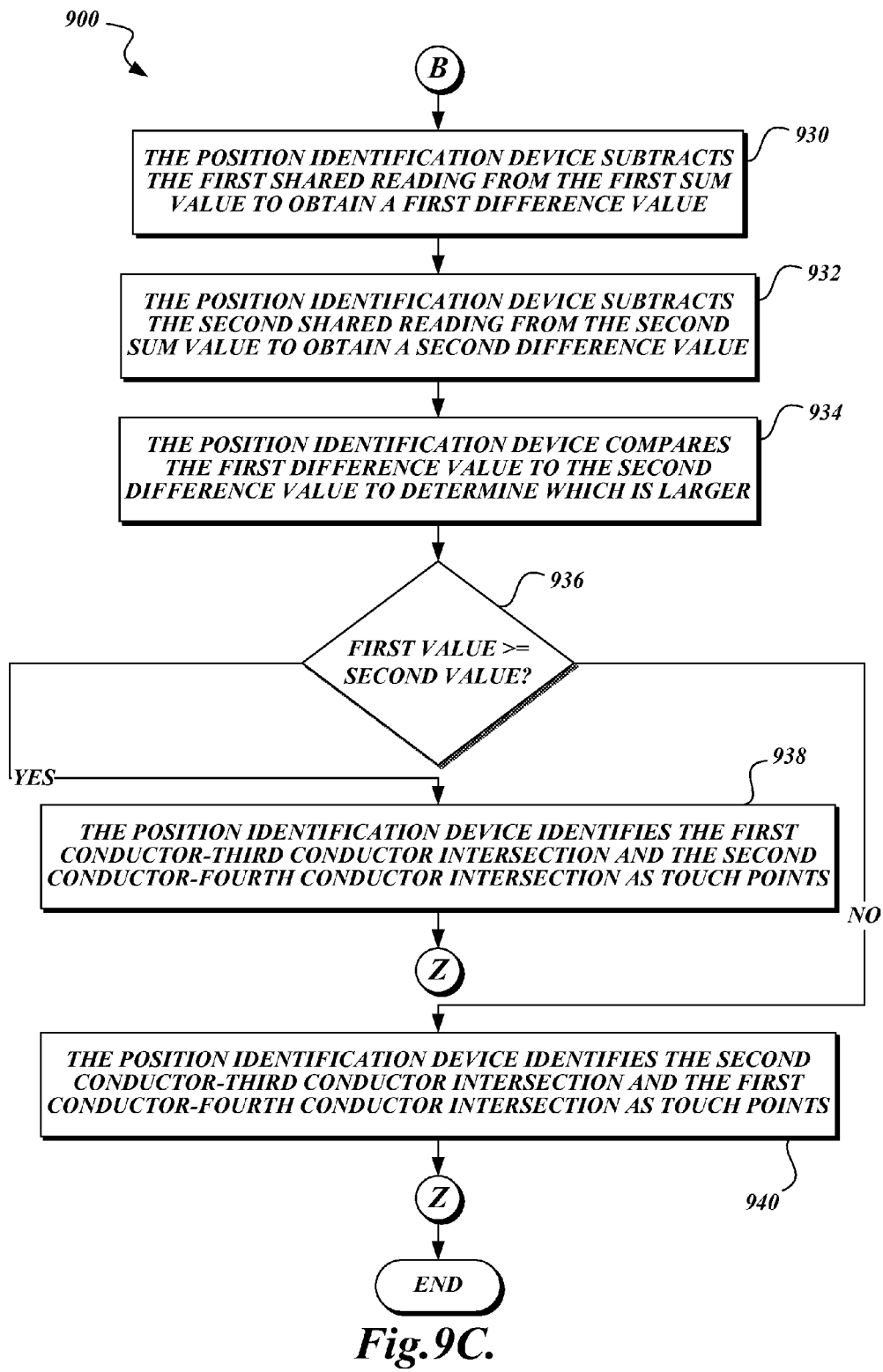

FIGS. 9A-9C illustrate an exemplary embodiment of a method 900 for detecting actual touch points in a multi-touch input device. From a start block, the method 900 proceeds to block 902, where, for each conductor in a first plurality of conductors, a signal measurement device is coupled to the conductor to obtain a reading of an electrical characteristic of the conductor. The first plurality of conductors can be a set of conductors arranged on a first axis or in a first direction, as described above. In one embodiment, the first plurality of conductors is arranged on an X axis, and the conductors of the first plurality of conductors are therefore called X conductors. Next, at block 904, for each conductor in a second plurality of conductors, the signal measurement device 210 is coupled to the conductor to obtain a reading of an electrical characteristic of the conductor. The second plurality of conductors can be a set of conductors arranged on a second axis or in a second direction, and can be perpendicular to the first direction, as described above. In one embodiment, the second plurality of conductors is arranged on a Y axis, and the conductors of the second plurality of conductors are therefore called Y conductors.

In embodiments such as those described above, the electrical characteristic in each case is capacitance, but other electrical characteristics may instead be measured without departing from the spirit of the described subject matter. Also, the coupling of the signal measurement device 210 to each conductor can also include providing a signal to the conductor and detecting changes in the provided signal to obtain the reading.

The method 900 then proceeds to block 906, where the readings of the electrical characteristics of the conductors are transmitted to a position identification device 508. In some embodiments, such as the one illustrated in FIG. 5A, an analog-to-digital conversion is performed before transmitting the readings to the position identification device 508, but in other embodiments, it is contemplated that the measurements can be performed directly on the analog signals.

In the next few blocks, the method 900 determines which conductors indicate a touch. At block 908, the position identification device 508 determines a first conductor at which a touch is indicated, the first conductor from the first plurality of conductors and having a first reading value. At block 910, the position identification device 508 determines a second conductor at which a touch is indicated, the second conductor from the first plurality of conductors and having a second reading value. At block 912, the position identification device 508 determines a third conductor at which a touch is indicated, the third conductor from the second plurality of conductors and having a third reading value. At block 914, the position identification device 508 determines a fourth conductor at which a touch is indicated, the fourth conductor from the second plurality of conductors and having a fourth reading value. From block 914, the method 900 proceeds to a continuation terminal ("terminal A").

These conductors may be determined in any order. The remaining portions of the method 900 assume that four conductors, including two from each plurality of conductors, have been identified. If only one conductor from each plurality of conductors can be identified, then only one actual touch point exists, and the rest of the method 900 for determining which of the intersections represent actual touch points is unnecessary. If two conductors in one plurality of conductors are identified and only one conductor in the other plurality of conductors is identified, the ghost points have merged with the actual touch points, and the remainder of the method 900 is similarly unnecessary. Other embodiments can allow more than two conductors from each plurality of conductors to be identified, to identify more than two actual touch points, but the use of two conductors on each axis is described herein for clarity.

From terminal A (FIG. 9B), the method 900 proceeds to block 916, where a measurement sharing device 504 couples the signal measurement device 506 to both the first conductor and the third conductor. Next, at block 918, the measurement sharing device 504 obtains a first shared reading of an electrical characteristic of both the first conductor and the third conductor, which represents the results of coupling both conductors to the signal measurement device 506 at the same time. The method 900 then proceeds to block 920, where the measurement sharing device 504 couples the signal measurement device 506 to both the first conductor and the fourth conductor, and then to block 922, where the measurement sharing device obtains a second shared reading of an electrical characteristic of both the first conductor and the fourth conductor, which likewise represents the results of coupling both conductors to the signal measurement device 506 at the same time. Next, at block 924, the signal measurement device 506 transmits the first shared reading and the second shared reading to the position identification device 508.

The method 900 then proceeds to block 926, where the position identification device 508 combines the first reading value and the third reading value to produce a first sum value. Next, at block 928, the position identification device 508 combines the first reading value and the fourth reading value to produce a second sum value. The method 900 then proceeds to another continuation terminal ("terminal B").

From terminal B (FIG. 9C), the method 900 proceeds to block 930, where the position identification device 508 subtracts the first shared reading from the first sum value to obtain a first difference value. Next, at block 932, the position identification device 508 subtracts the second shared reading from the second sum value to obtain a second difference value. The method 900 then proceeds to block 934, where the position identification device 508 compares the first difference value to the second difference value to determine which is larger. Next, at decision block 936, a test is performed to determine whether the first difference value is greater than or equal to the second difference value. If the answer to the test at decision block 936 is YES, the method 900 proceeds to block 938, where the position identification device 508 identifies the intersection of the first conductor and the third conductor as an actual touch point, and by process of elimination also identifies the intersection of the second conductor and the fourth conductor as touch points. These intersections are transmitted to a host system as the actual touch points, and the method 900 proceeds to a continuation terminal ("terminal Z").

If the answer to the test at decision block 936 is NO, the method 900 proceeds to block 940, where the position identification device 508 identifies the intersection of the second conductor and the third conductor as an actual touch point, and by process of elimination also identifies the intersection of the first conductor and the fourth conductor as touch points. These intersections are transmitted to a host system as the actual touch points Finally, the method 900 proceeds to terminal Z, and then to an end block, where the method 900 terminates.

In one embodiment, a method such as method 900 is used along with a touch-sensitive input device such as that illustrated in FIG. 5A to detect actual touch points. When using a signal measurement device 506 that includes an analog-to-digital converter such as that illustrated in FIG. 8, a hypothetical example of the calculations that occur would be as follows. Assume that digital readings taken on each of the conductors were as follows: Conductor 510B has a reading of 360, conductor 510D has a reading of 290, conductor 512B has a reading of 340, and conductor 512D has a reading of 300. In other words, the counter 808 measured 360 clock ticks for the comparator 804 to pulse a specified number of times when conductor 510B was coupled to the signal measurement device 506, and so on. In one embodiment, the system will choose the conductor with the highest signal on the Y-axis as the first conductor of method 900. Next, a combined reading is taken with conductor 512B and conductor 510B, by connecting both conductors to the signal measurement device 506 at the same time. The signal measurement device 506 obtains a combined reading for these two conductors of 650. Then, a combined reading is taken with conductor 512B and conductor 510D at the same time, to obtain a combined reading of 540. The respective difference values are found to be 50 for the first intersection (360+340−650=50), and 90 for the second intersection (290+340−540=90). Therefore, it is determined that the second intersection, that is, the intersection of conductor 512B and conductor 510D, is an actual touch point, and that the first intersection is a ghost point. Knowing this, it can be inferred that the intersection of conductor 512D and conductor 510B is the other actual touch point, and the remaining intersection is a ghost point. These location values are then transmitted to a host device.

While illustrative embodiments have been illustrated and described, it will be appreciated that various changes can be made therein without departing from the spirit and scope of the invention. For example, the functionality of elements described as separate components above may be combined into a single component, or the functions of a single element may be broken up into multiple separate components.

The embodiments of the invention in which an exclusive property or privilege is claimed are defined as follows:

1. A method executed by a multi-touch input device including multiple conductors on a first axis and multiple conductors on a second axis different from the first axis, for detecting actual touch points that are simultaneously indicated, the method comprising:

determining a first conductor on the first axis at which one of multiple simultaneous touches is indicated;

determining a first conductor and a second conductor on the second axis at which one of the multiple simultaneous touches is indicated;

multiplexing the first conductor on the first axis and the first conductor on the second axis to perform a first combined measurement by coupling both the first conductor on the first axis and the first conductor on the second axis to a signal measuring device at the same time;

multiplexing the first conductor on the first axis and the second conductor on the second axis to perform a second combined measurement by coupling both the first conductor on the first axis and the second conductor on the second axis to the signal measuring device at the same time; and comparing the first combined measurement and the second combined measurement to determine a first actual touch point and a second actual touch point that are simultaneously indicated as opposed to a ghost point.

2. The method of claim 1, wherein comparing the first combined measurement and the second combined measurement further comprises comparing separate measurements performed on the first conductor on the first axis, on the first conductor on the second axis, and on the second conductor on the second axis to the first combined measurement and the second combined measurement, including adding a measurement performed on the first conductor on the first axis to a measurement performed on the first conductor on the second axis.

3. The method of claim 2, wherein comparing separate measurements further comprises adding a measurement performed on the first conductor on the first axis to a measurement performed on the second conductor on the second axis.

4. The method of claim 3, wherein the first touch point is the intersection of the first conductor on the first axis and the first conductor on the second axis when a sum of the separate measurements performed on the first conductor on the first axis and the first conductor on the second axis minus the first combined measurement is greater than or equal to a sum of the separate measurements performed on the first conductor on the first axis and the second conductor on the second axis minus the second combined measurement.

5. The method of claim 4, wherein the second touch point is determined to be the intersection of the second conductor on the first axis and the second conductor on the second axis by virtue of the determination of the first touch point.

6. The method of claim 1, further comprising:

determining a second conductor on the first axis at which a touch is indicated;

multiplexing the second conductor on the first axis and the second conductor on the second axis to perform a combined measurement that supplements the first combined measurement; and multiplexing the first conductor on the first axis and the second conductor on the second axis to perform a combined measurement that supplements the second combined measurement.

7. A method in a multi-touch sensor including a plurality of X conductors and a plurality of Y conductors, for detecting actual touch points that are simultaneously indicated as opposed to a ghost point, the method comprising:

determining a first X conductor at a first X location at which one of multiple simultaneous touches is indicated;

determining a first Y conductor at a first Y location and a second Y conductor at a second Y location at which one of the multiple simultaneous touches is indicated;

obtaining a first combined capacitance value by measuring a combined capacitance of the first X conductor and the first Y conductor by energizing both the first X conductor and the first Y conductor simultaneously;

obtaining a second combined capacitance value by measuring a combined capacitance of the first X conductor and the second Y conductor by energizing both the first X conductor and the second Y conductor simultaneously;

comparing the combined capacitance values to a separate capacitance value of the first X conductor, the first Y conductor, and the second Y conductor to determine which intersections of the first X location, a second X location, the first Y location, and the second Y location correspond to actual touch points on the sensor as opposed to a ghost point; and providing the intersections which are determined to correspond to the actual touch points on the sensor for further processing.

8. The method of claim 7, wherein comparing the combined capacitance values includes:

adding a first X capacitance value of the first X conductor to a first Y capacitance value of the first Y conductor to determine a first XY capacitance value;

adding the first X capacitance value to a second Y capacitance value of the second Y conductor to determine a second XY capacitance value;

subtracting the first combined capacitance value from the first XY capacitance value to determine a first difference value;

subtracting the second combined capacitance value from the second XY capacitance value to determine a second difference value;

identifying the intersection of the first X location and the first Y location, along with the intersection of the second X location and the second Y location, as locations that correspond to objects in contact with the sensor when the first difference value is greater than or equal to the second difference value; and identifying the intersection of the first X location and the second Y location, along with the intersection of the second X location and the first Y location, as locations that correspond to objects in contact with the sensor when the first difference value is less than the second difference value.

9. The method of claim 7, wherein obtaining the first combined capacitance value by measuring the combined capacitance of the first X conductor and the first Y conductor includes coupling the first X conductor and the first Y conductor to a signal measuring device at the same time.

10. The method of claim 7, wherein obtaining the second combined capacitance value by measuring the combined capacitance of the first X conductor and the second Y conductor includes coupling the first X conductor and the second Y conductor to a signal measuring device at the same time.

11. The method of claim 7, further comprising coupling only the first X conductor to a signal measuring device to obtain a first X capacitance value of the first X conductor.

12. The method of claim 7, further comprising coupling only the first Y conductor to a signal measuring device to obtain a first Y capacitance value of the first Y conductor, and coupling only the second Y conductor to the signal measuring device to obtain a second Y capacitance value of the second Y conductor.

13. The method of claim 7, further comprising measuring a capacitance of each of the plurality of X conductors, and choosing the first X location and the second X location according to the relative capacitance of the plurality of X conductors.

14. The method of claim 7, further comprising measuring a capacitance of each of the plurality of Y conductors, and choosing the first Y location and the second Y location according to the relative capacitance of the plurality of Y conductors.

15. A multi-touch sensor capable of discerning an actual touch from a ghost touch amongst multiple simultaneous touches, comprising:
   a first plurality of conductors arranged in a first direction;
   a second plurality of conductors arranged in a second direction and intersecting the first plurality of conductors;
   a signal measurement device configured to receive measurement signals from the conductors;
   a measurement sharing device coupled to the signal measurement device;
   a conductor selecting device configured to couple a conductor of the first plurality of conductors to the measurement sharing device, and to separately couple a conductor of the second plurality of conductors to the measurement sharing device; and
   a position identification device configured to instruct the measurement sharing device and the conductor selecting device, in case multiple simultaneous touches are detected based on a first conductor and a second conductor arranged in the first direction and based on a first conductor and a second conductor arranged in the second direction:
      to couple the first conductor arranged in the first direction and the first conductor arranged in the second direction to the signal measurement device at the same time to perform a first combined measurement; and
      to couple the first conductor arranged in the first direction and the second conductor arranged in the second direction to the signal measurement device at the same time to perform a second combined measurement,
   and further configured to receive representations of the first and second combined measurements from the signal measurement device and to compare the first and second combined measurements to determine a first actual touch point and a second actual touch point that are simultaneously indicated as opposed to a ghost point.

16. The multi-touch sensor of claim 15, wherein the position identification device is further configured to receive the first and second combined measurements each representing a result of a test of capacitance of coupled two conductors.

17. The multi-touch sensor of claim 15, wherein the position identification device is further configured to compare the first or second combined measurements to a sum of separate measurements of the coupled two conductors to identify an actual touch point.

18. The multi-touch sensor of claim 15, wherein the measurement sharing device is configured to couple the output of the conductor selecting device with respect to the first plurality of conductors with the output of the conductor selecting device with respect to the second plurality of conductors before coupling the output to the signal measurement device.

19. The multi-touch sensor of claim 15, wherein the first plurality of conductors is arranged on a first layer and the second plurality of conductors is arranged on a second layer separated from the first layer by a dielectric layer.

20. The multi-touch sensor of claim 15, wherein the multi-touch sensor is configured to return an indication of an actual touch point corresponding to a location where a sum of measurements of capacitance of two separate conductors minus a combined measurement of capacitance of the two conductors is greater than a similar measurement at a location corresponding to a ghost point.

21. A multi-touch sensor capable of discerning an actual touch from a ghost touch amongst multiple simultaneous touches, comprising:
   a first signal measurement device configured to apply a signal to and receive measurement signals from a first plurality of conductors arranged in a first direction;
   a second signal measurement device configured to apply a signal to a second plurality of conductors arranged in a second direction crossing the first plurality of conductors;
   a conductor selecting device configured to selectively couple a conductor of the first plurality of conductors to the first signal measurement device, and to selectively couple a conductor of the second plurality of conductors to the second signal measurement device; and
   a position identification device configured to, in case multiple simultaneous touches are detected based on a first conductor and a second conductor arranged in the first direction and based on a first conductor and a second conductor arranged in the second direction:
      instruct the conductor selecting device to couple the first conductor arranged in the first direction to the first signal measurement device;
      instruct the conductor selecting device to couple the first conductor arranged in the second direction to the second signal measurement device;
      instruct the first signal measurement device and second signal measurement device to each apply a signal to the coupled conductors at the same time to obtain a first combined measurement of the first conductor arranged in the first direction and the first conductor arranged in the second direction;
      instruct the conductor selecting device to decouple the first conductor arranged in the second direction and couple the second conductor arranged in the second direction to the second signal measurement device;
      instruct the first signal measurement device and second signal measurement device to each apply a signal to the coupled conductors at the same time to obtain a second combined measurement of the first conductor arranged in the first direction and the second conductor arranged in the second direction; and
      compare the first combined measurement and the second combined measurement to determine a first actual touch point and a second actual touch point that are simultaneously indicated as opposed to a ghost point.

22. The multi-touch sensor of claim 21, wherein the first signal measurement device and the second signal measurement device are configured to apply a DC signal to associated conductors.

* * * * *